United States Patent
Hosea et al.

(10) Patent No.: US 9,690,746 B1
(45) Date of Patent: Jun. 27, 2017

(54) COMPUTING DEVICES FOR SENDING AND RECEIVING CONFIGURATION INFORMATION

(71) Applicant: Crimson Corporation, Dover, DE (US)

(72) Inventors: Frank W. Hosea, Murray, UT (US); Daniel T. Alger, South Salt Lake, UT (US)

(73) Assignee: Crimson Corporation, Dover, DE (US)

( * ) Notice: Subject to any disclaimer, the term of this patent is extended or adjusted under 35 U.S.C. 154(b) by 466 days.

(21) Appl. No.: 13/790,353

(22) Filed: Mar. 8, 2013

(51) Int. Cl.
*G06F 15/173* (2006.01)
*G06F 15/177* (2006.01)

(52) U.S. Cl.
CPC .................................. *G06F 15/177* (2013.01)

(58) Field of Classification Search
CPC .. G06F 15/177; G06F 9/4411; G06F 9/44505; H04L 41/0806; H04L 41/22; H04L 12/2807; H04L 63/083; H04W 88/02; G06K 19/06028; G06K 7/1417
USPC .... 709/220–229; 235/462.01, 462.09, 462.1, 235/462.14, 462.15, 462.3, 462.45, 235/462.49, 472.01, 472.02, 472.03; 370/254
See application file for complete search history.

(56) References Cited

U.S. PATENT DOCUMENTS

| 8,668,144 | B2* | 3/2014 | Evevsky ............... G06F 21/31 235/380 |
| 2007/0123217 | A1* | 5/2007 | Adams et al. ............ 455/412.1 |
| 2008/0250122 | A1* | 10/2008 | Zsigmond et al. ........... 709/220 |
| 2010/0163613 | A1* | 7/2010 | Bucher et al. ................ 235/375 |
| 2010/0180016 | A1* | 7/2010 | Bugwadia et al. ........... 709/220 |
| 2012/0284374 | A1* | 11/2012 | Deutsch et al. .............. 709/220 |
| 2013/0032634 | A1* | 2/2013 | McKirdy ............... G06F 17/00 235/375 |
| 2013/0124855 | A1* | 5/2013 | Varadarajan ....... G06Q 20/3276 713/155 |
| 2014/0122702 | A1* | 5/2014 | Jung et al. .................... 709/224 |
| 2014/0142979 | A1* | 5/2014 | Mitsunaga ...................... 705/3 |
| 2016/0323107 | A1* | 11/2016 | Bhogal ................. H04L 9/3247 |
| 2016/0323108 | A1* | 11/2016 | Bhogal ................. H04L 9/3247 |

* cited by examiner

*Primary Examiner* — Alina N Boutah

(57) ABSTRACT

A computing device configured for sending configuration information is described. The computing device includes a processor and instructions stored in memory that is in electronic communication with the processor. The computing device obtains access information. The computing device further generates a graphic based on the access information. The computing device also receives a configuration information request associated with the graphic. Additionally, the computing device sends the configuration information.

19 Claims, 10 Drawing Sheets

COMPUTING DEVICES FOR SENDING AND RECEIVING CONFIGURATION INFORMATION

TECHNICAL FIELD

The present disclosure relates generally to computers and computer-related technology. More specifically, the present disclosure relates to computing devices for sending and receiving configuration information.

BACKGROUND

The use of electronic devices has become increasingly prevalent in modern society. As the cost of electronic devices has declined and as the usefulness of electronic devices has increased, people are using them for a wide variety of purposes. For example, many people use electronic devices to perform work tasks as well as to seek entertainment. One type of an electronic device is a computer.

Computer technologies continue to advance at a rapid pace. Computers commonly used include everything from hand-held computing devices to large multi-processor computer systems. These computers include software, such as applications including user interfaces, in order to make them useful and accessible to an end user. Computers are increasingly linked with other computers through networks. With the expansion of computer technology, the size of networks has continued to increase. Networks may link computers together that are a great distance apart.

One of the challenges with large networks is configuring the electronic devices that are connected to the network. For example, electronic devices that are not properly configured may not be able to communicate information via the network. In some cases, the challenges associated with improperly configured electronic devices may result in errors throughout the network. As can be observed from this discussion, systems and methods that assist in configuration over a network may be beneficial.

DETAILED DESCRIPTION

Figure 1:
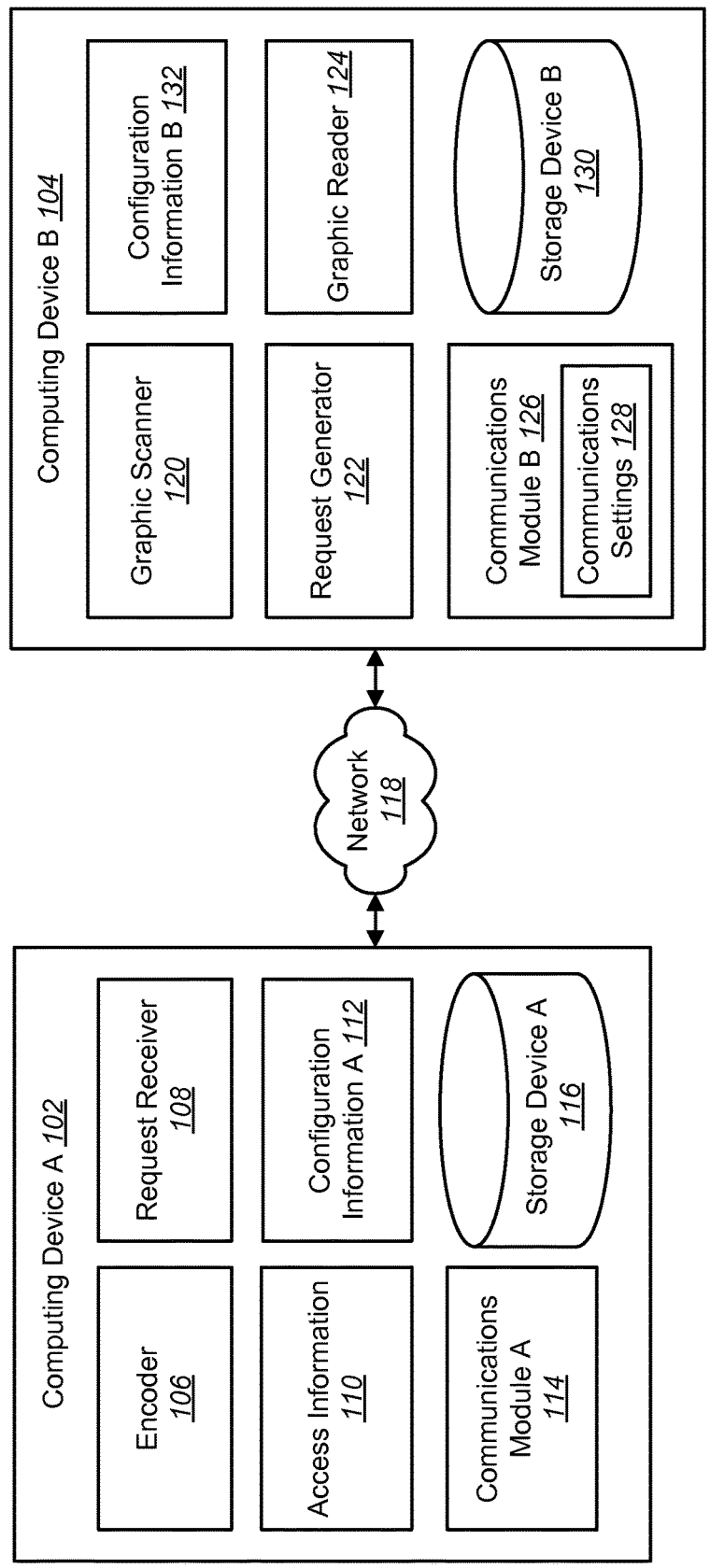
FIG. 1 is a block diagram illustrating one configuration of computing devices in which systems and methods for sending and receiving configuration information may be implemented.

A computing device configured for sending configuration information is described. The computing device includes a processor and instructions stored in memory that is in electronic communication with the processor. The computing device obtains access information. The computing device also generates a graphic based on the access information. The computing device also receives a configuration information request associated with the graphic. Furthermore, the computing device sends the configuration information.

Generating the graphic based on the access information may include encoding the access information into the graphic. The computing device may secure the configuration information to produce secured configuration information. The computing device may receive authentication information. The computing device may send an inventory data request and receive inventory data.

The access information may include an authentication information request, a network connectivity module, a digital certificate, access identification information, a connecting prompt and/or a scanning module. The configuration information may include an authentication rule, configuration identification information, a policy, an application, a setting, a request for inventory data, an implementation instruction and/or a configuration prompt.

A computing device configured for receiving configuration information is also described. The computing device includes a processor and instructions stored in memory that is in electronic communication with the processor. The computing device scans a graphic. The computing device also extracts access information based on the graphic. The computing device also applies access information to one or more communications settings. The computing device further sends a configuration information request associated with the graphic. The computing device additionally receives the configuration information.

The computing device may receive a graphic reader that decodes the access information. The computing device may determine inventory data and send inventory data.

The configuration information may be secured configuration information. The computing device may receive a security module that interprets the secured configuration information. The access information may include an authentication information request. The computing device may send authentication information.

A method for sending configuration information by a computing device is also described. The method includes obtaining access information. The method additionally includes generating a graphic based on the access information. The method also includes receiving a configuration information request associated with the graphic. The method further includes sending the configuration information.

A method for receiving configuration information by a computing device is also described. The method includes scanning a graphic. The method also includes extracting access information based on the graphic. The method also includes applying access information to one or more communications settings. The method also includes sending a configuration information request associated with the graphic. The method further includes receiving the configuration information.

The systems and methods disclosed herein describe computing devices for sending and receiving configuration information. In some approaches, a mobile device (e.g., a pad or tablet device) may utilize a camera to configure itself from a readable graphic like a barcode. For example, the graphic may include settings for a Wi-Fi (e.g., Institute of Electrical and Electronics Engineers (IEEE) 802.11) configuration for the device. In some approaches, a pad or tablet device manufacturer may place an application on the device in the factory to simplify the steps for configuring device settings (e.g., the Wi-Fi configuration). The systems and methods disclosed herein may utilize a machine-produced graphic (e.g., a Quick Response (QR) barcode) as an input for designating the configuration settings. This may enable a new device to be configured by a user with limited time or understanding of the steps for set up and configuration. In some approaches, the systems and methods disclosed herein may be implemented with an administrative system management suite.

One example of the systems and methods disclosed herein is given as follows. In this example, a device copies a secure communications application, a barcode application and a Wi-Fi configuration application, along with a user interface, to the memory of the device. The device may then be packaged and shipped to an end user. A plug-in on a management console may create a barcode containing Wi-Fi configuration information, a unique certificate and/or core server information, etc., and may provide the barcode to an end user. In some approaches, policies and/or applications may be designated (based on administrator input, for example) to be pushed to the device (e.g., tablet) upon connection. In one example, the tablet starts and application(s) to configure the Wi-Fi are initiated. The barcode scanner of the device (e.g., tablet) scans the barcode containing the Wi-Fi configuration, connects to a network and provides credentials. Then, the core server or a directory service authenticates the tablet, and the tablet connects to the core server based on the information provided. The core server then pushes policies and applications to the device and retrieves inventory data.

Various configurations of the systems and methods are now described with reference to the Figures, where like reference numbers may indicate identical or functionally similar elements. The configurations of the present systems and methods, as generally described and illustrated in the Figures herein, could be arranged and designed in a wide variety of different configurations. Thus, the following more detailed description of several configurations, as represented in the Figures, is not intended to limit the scope of the systems and methods, as claimed, but is merely representative of the various configurations of the systems and methods.

FIG. 1 is a block diagram that illustrates one configuration of computing devices 102, 104 in which systems and methods for sending and receiving configuration information may be implemented. Examples of computing device A 102 and/or computing device B 104 include, but are not limited to, desktop computers, laptop computers, servers, supercomputers, tablet devices, cellular phones, smartphones, gaming systems and any other computing device. It should be noted that while FIG. 1 depicts two computing devices 102, 104, the systems and methods disclosed herein may be applied to any number of computing devices 102, 104. Computing device A 102 may include storage device A 116, an encoder 106, a request receiver 108, access information 110, configuration information A 112 and/or communications module A 114. In an alternative implementation, storage device A 116 may be separate from and coupled to computing device A 102. Computing device B 104 may include storage device B 130, a graphic scanner 120, a request generator 122, a graphic reader 124, configuration information B 132 and/or a communications module B 126. In an alternative implementation, storage device B 130 may be separate from and coupled to computing device B 104. Communications module B 126 may include one or more communications settings 128. In some instances, computing device A 102 may communicate with computing device B 104 via a network 118.

It should be noted that one or more of the elements depicted as included within computing device A 102 and/or computing device B 104 may be implemented in hardware, software or a combination of both. For example, the encoder 106 may be implemented in hardware, software or a combination of both.

The encoder 106 may create a graphic that includes information. In some implementations, computing device B 104 may read (e.g., scan, capture, process, etc.) the graphic in order to retrieve the information included in the graphic. For instance, the encoder 106 may generate a graphic that contains Wi-Fi configuration information. In this case, computing device B 104 may read the graphic in order to retrieve and utilize the Wi-Fi configuration information. Once the graphic is read, computing device B 104 may access the Wi-Fi configuration information automatically. The encoder 106 may store information to the graphic using any number of encoding protocols. Thus different computing devices may retrieve different information from the graphic depending on the decoding protocol used by the computing devices. Examples of graphics include, but are not limited to, linear barcodes, stacked barcodes, matrix barcodes, QR codes, micro QR codes, artistic QR codes and high capacity color barcodes.

The encoder 106 may encode information into a graphic. The encoder 106 may also provide the graphic to be distributed to computing device B 104. In some approaches, the encoder 106 may provide the graphic to a printer to be produced in a tangible medium. The encoder 106 may also provide the graphic to communications module A 114 for transmission to another device, for example through email or displayed on a web page.

In an alternative implementation not illustrated in FIG. 1, the encoder 106 may be included in another computing device (not illustrated in FIG. 1) that sends the generated graphic to computing device A 102. For instance, a management console may include the encoder 106 that encodes the access information 110 to a digital graphic. In this example, the access information 110 incorporated into the graphic may also be included on the management console. After the digital graphic has been generated, the management console may send the graphic to computing device A 102 (e.g., an administrative server) to be distributed. In some implementations, the management console may obtain a plug-in that permits the encoder 106 to generate a graphic. This plug-in may be provided by computing device A 102 (e.g., the administrative server described earlier).

The graphic created by the encoder 106 may be based on access information 110. Access information 110 may include one or more pieces of information that allow communication with computing device A 102 and/or the network 118. Upon reception, the access information 110 may then enable computing device B 104 to communicate with computing device A 102 and/or the network 118. For example, the access information 110 may include the Service Set Identifier (SSID) (e.g., Institute of Electrical and Electronics Engineers (IEEE) 802.11) and passkey of the network 118. Upon input of the SSID and passkey, computing device B 104 may be granted access to the network 118. In another example, the access information 110 may include the Internet Protocol (IP) address of computing device A 102, (e.g., a server). Similarly, upon input of the IP address, computing device B 104 may be granted access to computing device A 102 and/or the network 118.

The access information 110 may be input into computing device B 104. For example, computing device B 104 may receive input of the SSID and passkey of the network 118. Alternatively, computing device B 104 may implement the access information 110 without any input. For example, computing device B 104 may automatically be granted access to communicate with computing device A 102 and/or the network 118 after the access information 110 (e.g., the SSID and passkey) has been extracted from the graphic. The access information 110 may include access limitations imposed on computing device B 104. For example, the access information 110 may indicate the devices of the network 118 that computing device B 104 may contact. Other examples of access information 110 will be described in greater detail below.

Configuration information A 112 may be utilized to configure computing device B 104. For example, configuration information A 112 may include device network settings that allow computing device B 104 to communicate with other devices via the network 118. In this example, as configuration information A 112 is received, computing device B's 104 network settings are changed such that it may communicate with other devices on the network 118. Configuration information A 112 may include configuration information for a number of devices. For example, computing device A 102 may be a network administrative server and configuration information A 112 may include configuration information for all the devices on the network 118. Examples of configuration information A 112 include, but are not limited to, data, network connectivity settings, internet protocols, communication protocols, policies and applications. Other examples of configuration information will be described in greater detail below.

Communications module A 114 allows computing device A 102 to communicate with other computing devices on the network 118. For example, communications module A 114 may send configuration information A 112 to computing device B 104. Communications module A 114 may set standards for communication between computing device A 102 and computing device B 104. Communications module A 114 may also include certain restrictions on communications. For example, communications module A 114 may limit what types of files may be transferred to/from computing device A 102. For example, it may be impermissible to transfer executable files.

The request receiver 108 receives requests for configuration information from other computing devices. For example, the request receiver 108 may process a request from computing device B 104 to send configuration information B 132 to computing device B 104.

The request received by the request receiver 108 may include information relating to the device that sent the request. For example, a request from computing device B 104 may include the IP address and a number of characteristics of computing device B 104. Based on the request, the request receiver 108 may then determine related configuration information A 112. For example, upon reception of a request, the request receiver 108 may determine that computing device B's 104 network protocol is not current. The request receiver 108 may then include configuration information A 112 relating to a network protocol update. Similarly, the request receiver 108 may determine that configuration information pertaining to updates in one of computing device B's 104 software applications is not necessary, and as a result does not include configuration information A 112 related to the software application. Thus, based on a particular request, the request receiver 108 may determine what portion of configuration information A 112 applies to computing device B 104.

Additionally or alternatively, the request receiver 108 may determine pertinent configuration information A 112 based on input. For example, computing device B 104 may request configuration information A 112 relating to network connectivity, but may not request configuration information A 112 relating to a software application update. In this example, the request receiver 108 may include configuration information A 112 relating to network connectivity, but not include configuration information A 112 relating to the software application update.

In some implementations, the request receiver 108 may require authentication information before processing a request. Examples of authentication information include, but are not limited to, username, password, biometric information, IP address, Media Access Control (MAC) address and device name verification.

Computing device A 102 may send all or part of configuration information A 112 to computing device B 104. Computing device B 104 may receive configuration information B 132 (which may be all or part of configuration information A 112, for example) from computing device A 102. In some implementations, computing device A 102 may be an administrative server that receives configuration information A 112 from another computing device (not shown in FIG. 1). In this example, the administrative server may receive configuration information A 112 from the other computing device and relay all or part of configuration information A 112 to computing device B 104. In some implementations, this other computing device may be termed a management console and/or may access a management console on computing device A 102 that manages other computing devices (e.g., computing device B 104).

Examples of storage device A 116 include hard disks, flash memory, dynamic random access memory (DRAM), static random access memory (SRAM), floppy disks, magnetic tapes, optical disks and any other data storage medium. Examples of configurations of storage device A 116 include direct-attached storage (DAS), storage area network (SAN) and network-attached storage (NAS), etc.

According to an example, storage device A 116 may be connected to computing device A 102. Examples of connections include, but are not limited to, a Universal Serial Bus (USB) connection, Ethernet connection, connection through an intervening computing device (e.g., a server) and connection through a network. For instance, storage device A 116 may be directly connected to computing device A 102.

It should be noted that in some configurations (not shown in FIG. 1), computing device A 102 may be coupled to storage device A 116 through an intervening computing device (e.g., a server, a desktop computer, etc.). For example, computing device A 102 may not be directly connected to storage device A 116, but may access storage device A 116 by communicating with the intervening computing device. For instance, the intervening computing device may host storage device A 116. Accordingly, the systems and methods disclosed herein may be applied to function in conjunction with the intervening computing device.

Computing device A 102 may be coupled to computing device B 104 through a network 118. Examples of a network 118 include personal area networks, local area networks (LAN), wide area networks (WAN), cellular networks and any other type of network.

The graphic scanner 120 records and stores the graphic to computing device B 104. For example, the graphic scanner 120 (e.g., camera of a smartphone) may take a picture of a QR code and store the graphic to storage device B 130. If the graphic is printed on a physical medium, the graphic scanner 120 may convert the physical graphic into a digital graphic. Examples of graphic scanners 120 include, but are not limited to, cameras, lasers, light sources, charge-coupled device (CCD) scanners, and contact image sensor (CIS) scanners.

A graphic reader 124 may be coupled to the graphic scanner 120. The graphic reader 124 may extract the information stored within the graphic. For example, a graphic reader 124 may extract the access information 110 (e.g., a Uniform Resource Locator (URL)) that is embedded in a QR code that was scanned by a graphic scanner 120 (e.g., a smartphone camera). The graphic reader 124 may employ any number of decoding protocols to extract the information. For example, a QR code may include information that is numerically encoded, alphanumerically encoded, byte encoded, and/or kanji encoded.

The request generator 122 may send a request to computing device A 102 to obtain configuration information B 132. The request sent by the request generator 122 may include information relating to computing device B 104. The request generator 122 may base the request on the characteristics of computing device B 104. For example, the request generator 122 may request an update to an old version of a software application on computing device B 104. The request generator 122 may also base the request on input. In this example, computing device B 104 may request an update to its network drivers.

Computing device B 104 may also include communications module B 126 that allows computing device B 104 to communicate with computing device A 102 and/or the network 118. Communications settings 128 within communications module B 126 may establish the procedure by which computing device B 104 communicates with computing device A 102 and/or the network 118. For example, the communications settings 128 may indicate protocols for communications between computing device A 102 and/or the network 118. Examples of the communications settings 128 include SSID settings, passkeys, protocols, version information, encryption protocols, authentication protocols, and/or formatting requirements, etc. In one example, the access information 110 included in a graphic and extracted by the graphic reader 124 indicates communication settings 128 that will allow computing device B 104 to communicate with computing device A 102 and/or the network 118.

As a result of the request, computing device B 104 may receive configuration information B 132. Configuration information B 132 may represent information that establishes device settings related to computing device B 104. For example, configuration information B 132 may include device network settings that allow communication between computing device B 104 and other devices on the network 118 (e.g., computing device A 102). In some approaches, configuration information B 132 may constitute a portion of configuration information A 112. For example, as described above configuration information A 112 may include configuration information for all computing devices on the network 118. Configuration information B 132 may include that portion of configuration information A 112 that pertains to computing device B 104, and may exclude that portion of configuration information A 112 that pertains to other computing devices on the network 118. Examples of configuration information B 132 include, but are not limited to network connectivity settings, internet protocols, communication protocols, computing policies and applications. Other examples of configuration information will be described in greater detail below.

Computing device B 104 may include storage device B 130. Examples of storage device B 130 include hard disks, flash memory, dynamic random access memory (DRAM), static random access memory (SRAM), floppy disks, magnetic tapes, optical disks and any other data storage medium. Examples of configurations of storage device B 130 include direct-attached storage (DAS), storage area network (SAN) and network-attached storage (NAS), etc.

According to an example, storage device B 130 may be connected to computing device B 104. Examples of connections include, but are not limited to, a USB connection, Ethernet connection, connection through an intervening computing device (e.g., a server) and connection through a network. For instance, storage device B 130 may be directly connected to computing device B 104.

It should be noted that in some configurations (not shown in FIG. 1), computing device B 104 may be coupled to storage device B 130 through an intervening computing device (e.g., a server, a desktop computer, etc.). For example, computing device B 104 may not be directly connected to storage device B 130, but may access storage device B 130 by communicating with the intervening computing device. For instance, the intervening computing device may host storage device B 130. Accordingly, the systems and methods disclosed herein may be applied to function in conjunction with the intervening computing device.

Figure 2:
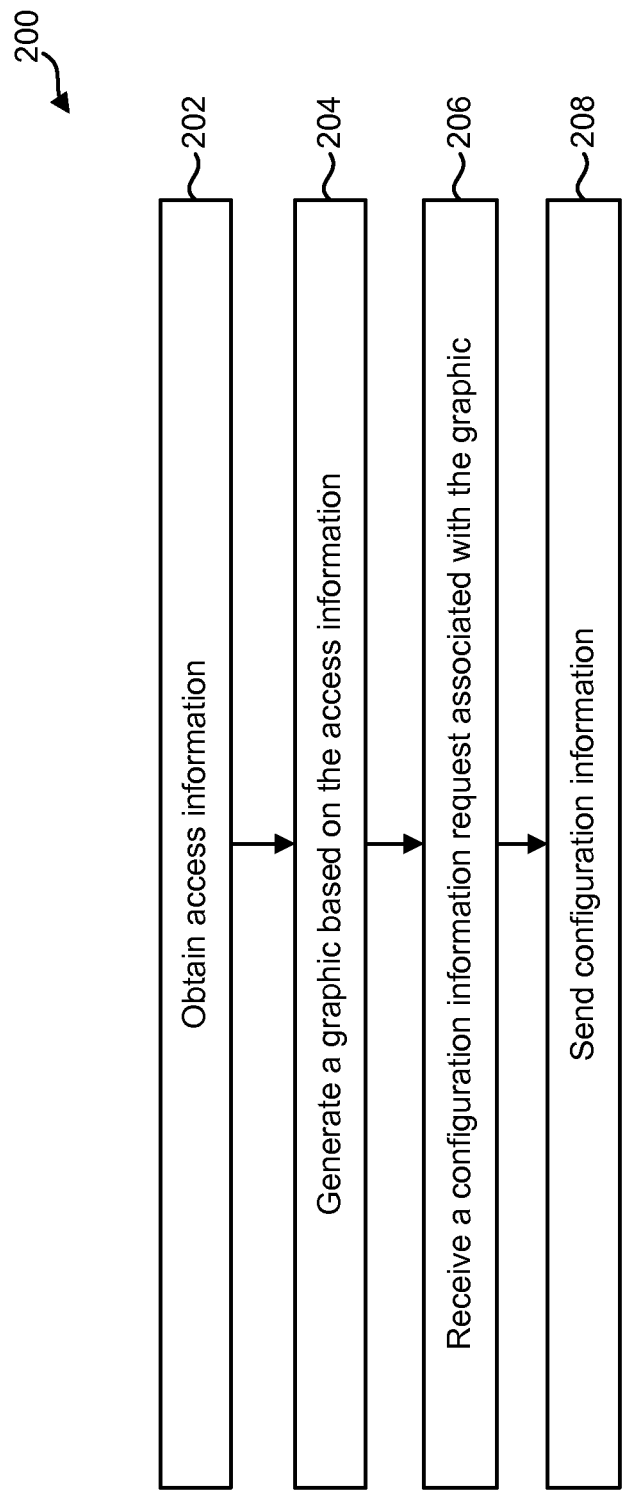
FIG. 2 is a flow diagram illustrating one configuration of a method for sending configuration information by a computing device.

FIG. 2 is a flow diagram illustrating one configuration of a method 200 for sending configuration information by a computing device. Computing device A 102 obtains 202 access information 110. As described above, the access information 110 may include one or more pieces of information that allows communication between computing devices on the network 118. An example of access information 110 is the SSID and passkey to the network 118. In this example, computing device A 102 may obtain the SSID and passkey from the network 118.

In some implementations, computing device A 102 may obtain 202 the access information 110 from another computing device. In this example, the other computing device sends the access information 110 to computing device A 102. In some implementations, this other computing device may be termed a management console and/or may access a management console on computing device A 102 that manages other computing devices (e.g., computing device B 104). The other computing device may obtain a plug-in module that creates the access information 110. The plug-in module may be obtained from computing device A 102 (e.g., an administrative server). The access information 110 may also be obtained from a network administrator. In another implementation computing device A 102 generates the access information 110.

The encoder 106 may generate 204 a graphic based on the access information 110. The access information 110 may be embedded in the graphic. For example, the graphic may include the SSID and passkey necessary to access the network 118. In one example, the graphic may include a portion of the access information 110. For example, the SSID of the network 118 may be embedded in the graphic. In this example, the passkey may be obtained by other means. Accessing the SSID and the passkey individually increases the security of the transfer of the access information 110. Examples of graphics include, but are not limited to, linear barcodes, stacked barcodes, matrix barcodes, QR codes, micro QR codes, artistic QR codes and high capacity color barcodes.

Different formats of the access information 110 may be encoded to a graphic. For example, numeric access information 110 and/or alphanumeric access information 110 may be included within a graphic. In some implementations, access information 110 with differing formats may be encoded into a graphic. For example, numeric access information 110 and alphanumeric access information 110 may be included within a graphic.

In some implementations, computing device A 102 may perform additional or alternative operations in order to secure communications. For example, computing device A 102 may encrypt the access information 110 to be embedded in the graphic. Computing device A 102 may use any number of encryption techniques to secure the access information 110.

According to some approaches, the encoder 106 may provide the graphic to be distributed to computing device B 104. In some approaches, the encoder 106 may provide the graphic to a printer to be produced in a tangible medium. The encoder 106 may also provide the graphic to communications module A 114 for transmission to another device, for example through email or displayed on a web page.

In some implementations, the encoder 106 generates 204 the graphic and encodes the access information 110. In other implementations, another computing device generates 204 the graphic and sends the graphic to computing device A 102. In some implementations, this other computing device may be termed a management console and/or may access a management console on computing device A 102 that manages other computing devices (e.g., computing device B 104). The management console may obtain a plug-in that allows it to generate a graphic and store the access information 110 to the graphic. The management console may obtain this plug-in from computing device A 102 (e.g., an administrative server). In these examples, the access information 110 may be stored on computing device A 102 (e.g., the administrative server) and sent to the management console to incorporate into the graphic, and/or the access information 110 may be stored on the management console to be incorporated into the graphic.

The request receiver 108 receives 206 a configuration information request associated with the graphic. Included is a request to send configuration information B 132 to computing device B 104. In some implementations, the request may also include technical characteristics of computing device B. In this example, the technical characteristics may be used to determine what portion of configuration information A 112 to send to computing device B 104 as configuration information B 132. For example, the request may indicate that an outdated version of a software application exists on computing device B 104. As a result, configuration information A 112 relating to an update of that software application may be sent to computing device B 104 as configuration information B 132. Other examples of configuration information A 112 include data, network connectivity settings, internet protocols, communication protocols, policies and applications.

In some implementations, the request may be based on input. Drawing from the example above, computing device B 104 may further request an update to an optional video card driver. Thus, the video card driver update may be included in configuration information A 112 that is sent to computing device B 104 as configuration information B 132.

The request may be based on the format of configuration information A 112 to be sent. For example, computing device A 102 may include alphanumeric configuration information A 112 within the graphic. The request in this example may then include alphanumeric configuration information A 112 associated with the graphic, while numeric configuration information A 112 stored on the graphic is not included.

Computing device A 102 sends 208 configuration information B 132. Once the request has been received, and pertinent configuration information B132 compiled, configuration information B 132 is then sent to computing device B 104. Configuration information B 132 may be sent over the network 118. Configuration information B 132 may include a portion of configuration information A 112 stored on computing device A 102. For example, computing device B 104 may only require configuration information B 132 relating to licensing protocols and certain communications policies, while configuration information A 112 stored on computing device A 102 includes software applications updates. Thus, a subset of configuration information A 112 is sent to computing device B 104. In some implementations, computing device A 102 may perform additional or alternative operations in order to secure the configuration information. For example, computing device A 102 may encrypt the configuration information.

In some implementations, sending 208 configuration information B 132 may include obtaining configuration information A 112 from another computing device. For example, computing device A 102 (e.g., an administrative server) may first obtain configuration information A 112 from a management console before sending 208 configuration information B 132 on to computing device B 104.

Figure 3:
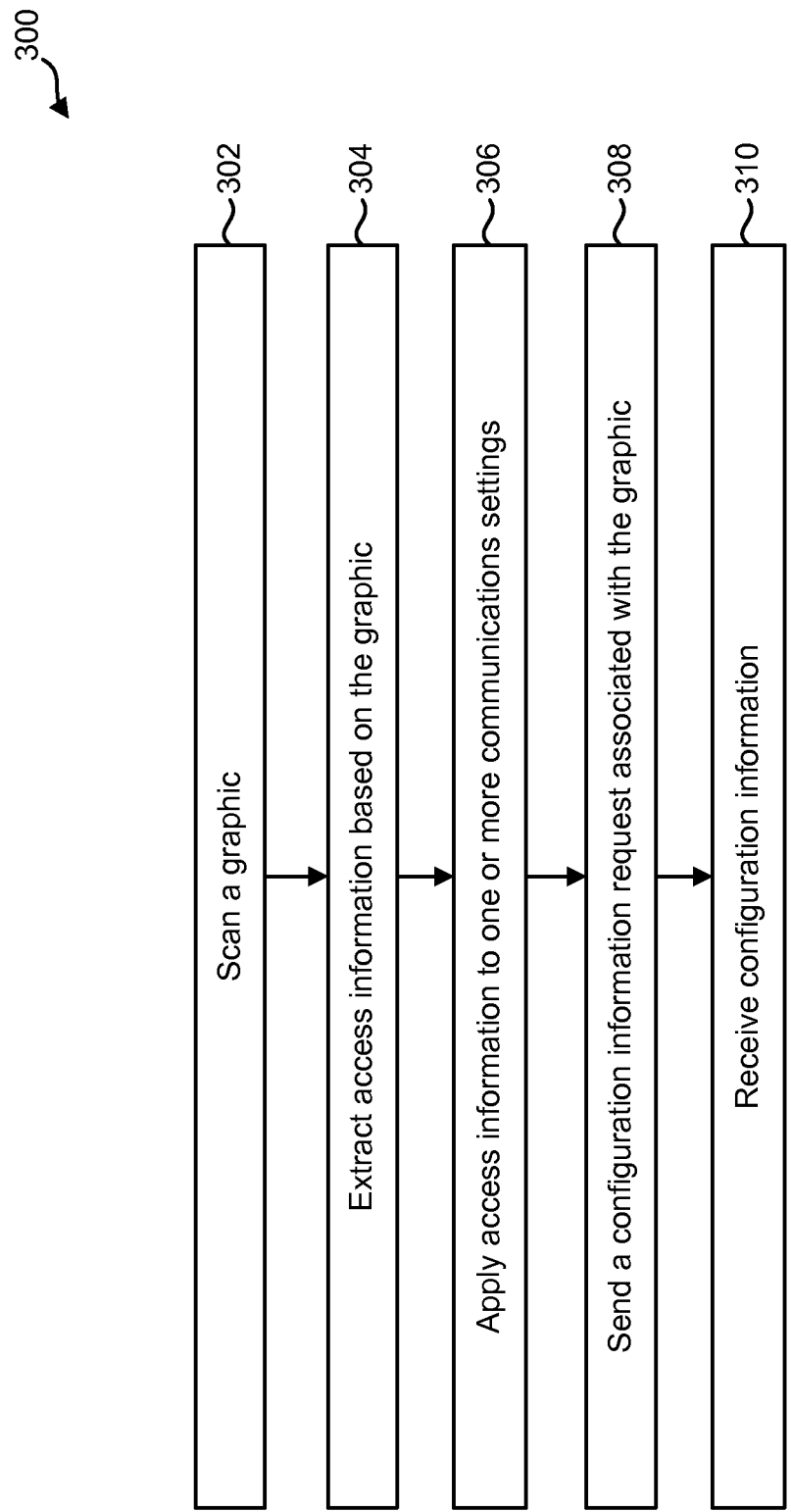
FIG. 3 is a flow diagram illustrating one configuration of a method for receiving configuration information by a computing device.

FIG. 3 is a flow diagram illustrating one configuration of a method 300 for receiving configuration information by a computing device. The graphic scanner 120 scans 302 a graphic. The graphic may include the access information 110. As described above, the access information 110 may include one or more pieces of information that allow communication between computing devices on the network 118. An example of access information 110 is the SSID and passkey to the network 118. In one example, the graphic may include a portion of the access information 110. For example, the SSID of the network 118 may be embedded in the graphic. In this example, the passkey may be obtained by other means.

Scanning 302 the graphic may include recording and storing the graphic on computing device B 104. For example, the graphic scanner 120 (e.g., the camera of a smartphone), may take a picture of the graphic and store the graphic to storage device B 130. If the graphic is printed on a physical medium, the graphic scanner 120 may convert the physical graphic into a digital graphic. Examples of graphic scanners 120 include, but are not limited to, cameras, lasers, light sources, CCD scanners and CIS scanners.

In some implementations, the graphic scanner 120 may receive a directive to scan a graphic. This directive may include activating the graphic scanner 120. In some implementations, the graphic scanner 120 may have an input interface that activates the scan. For example, a graphic scanner 120 (e.g., smartphone camera) may include a button that, when pressed, takes a picture of the graphic. In another example, a smartphone application, when selected, scans a QR code. In other implementations, the graphic scanner 120 is activated without any input. For example, a smartphone application may automatically scan a QR code.

The graphic reader 124 may then extract 304 the access information 110 based on the graphic. As explained above, the graphic may contain the access information 110 that allows communication over the network 118. The access information 110 may include such things as the network's 118 SSID and passkey. The access information 110 may also include the IP address of computing device A 102 (e.g., a server). Upon extraction, the access information 110 may be implemented to send a configuration information request across the network 118. An example of extraction of the access information is presented as follows. A graphic reader 124 may extract the access information 110 (e.g., a URL) that is embedded in a QR code that was scanned by a graphic scanner 120 (e.g., a smartphone camera). The graphic reader 124 may employ any number of decoding protocols to extract the information.

In some implementations, extracting 304 the access information 110 may include extracting a portion of the access information 110 stored on the graphic. For example, numeric access information 110 and alphanumeric access information 110 may be encoded to the graphic. The graphic reader 124 may extract the numeric access information 110 while not extracting the alphanumeric access information 110. Extraction of a portion of the access information 110 may also be determined based on input. For example, the access information 110 may include a prompt wherein computing device B 104 selects the access information 110 to extract. Additionally or alternatively, a portion of the information encoded in the graphic may be encrypted while another portion is unencrypted. In some cases, computing device B 104 may initially extract unencrypted access information 110 and/or may later extract the encrypted information when decryption information (e.g., a decryption key) is provided by computing device A 102 (upon completing authentication procedures, for example).

In some implementations, computing device B 104 may perform additional or alternative operations in order to access secure communications. For example, computing device B 104 may apply an algorithm to decrypt encrypted access information 110. In another example, computing device B 104 may require entry of a password before access to the network 118 may be granted.

Computing device B 104 may store the extracted access information 110 to storage device B 130. As described above, storage device B 130 may be connected to computing device B 104. In some implementations, storage device B 130 may be coupled to computing device B 104 through an intervening computing device.

Computing device B 104 may apply 306 the access information 110 to one or more communications settings 128. As described above, communications settings 128 may establish the procedures and protocols by which computing device B 104 communicates with other computing devices on the network 118 (e.g., computing device A 102). With the access information 110 extracted, it may be applied to the communications settings 128 to allow computing device B 104 to communicate across the network 118. For example, the SSID and passkey of the network 118 may be incorporated into computing device B's 104 communications module B 126 such that the network 118 may be accessed. Applying 306 the access information 110 may include granting computing device B 104 access to the network 118 without any input.

In some implementations, computing device B 104 alters the communication settings 128 based on the access information 110 to enable communications with the network 118. For example, computing device B 104 may implement communications protocols and update communications drivers.

The request generator 122 may send 308 a configuration information request associated with the graphic. Once the access information 110 has been applied to the communications settings 128, a configuration information request is sent requesting configuration information B 132 be sent to computing device B 104. As described above, configuration information B 132 may represent information that establishes device settings related to computing device B 104. For example, configuration information B 132 may include device network settings that allow communication between computing devices on the network 118. Other examples of configuration information B 132 include, but is not limited to, network connectivity settings, internet protocols, communication protocols, computing policies and applications. Other examples of configuration information will be described in greater detail below.

The request generator 122 may base the configuration information request on characteristics pertaining to computing device B 104. For example, the request generator 122 may include its system characteristics in the configuration information request. Computing device A 102 may then send configuration information B 132 that may be based on those system characteristics.

In some implementations, the configuration information request may be based on the request generator's 122 input. For example, the request generator 122 may request an update to an old version of a software application on computing device B 104. In another example, the request generator 122 may base the configuration information request on a response to a prompt within the access information 110 to request an update to a video card driver.

In some implementations, computing device B 104 may perform additional or alternative operations in order to secure the configuration information request. For example, computing device B 104 may encrypt the configuration information request. This secures transmissions of information across the network 118 is secured.

Computing device B 104 may receive 310 configuration information B 132. Configuration information B 132 may be received via the network 118. As described above, configuration information B 132 may represent information that establishes device settings related to computing device B 104 and may be a subset of configuration information A 112. In some implementations, computing device B 104 may receive configuration information B 132 from another computing device. For example, computing device A 102 may first send configuration information B 132 to a management console before sending configuration information B 132 on to computing device B 104.

According to some implementations, configuration information B 132 may include instructions that implement configuration information B 132 to computing device B 104. In some implementations, computing device B 104 implements configuration information B 132 on computing device B 104 without any additional input. In other implementations, computing device B 104 implements configuration information B 132 based on received input. For example, an input interface may solicit permission before implementing configuration information B 132 on computing device B 104.

In some implementations, configuration information B 132 that is received is not the same as the configuration information requested. For example, computing device B 104 may request a software application. However, computing device A 102 may not include the software application in configuration information B 132. For example, computing device B 104 may not be formatted to operate the software application.

In some implementations, configuration information B 132 may change one or more of the operational aspects of computing device B 104. For example, additional security protocols may be installed on computing device B 104. Additionally, versions of software applications may be updated.

Figure 4:
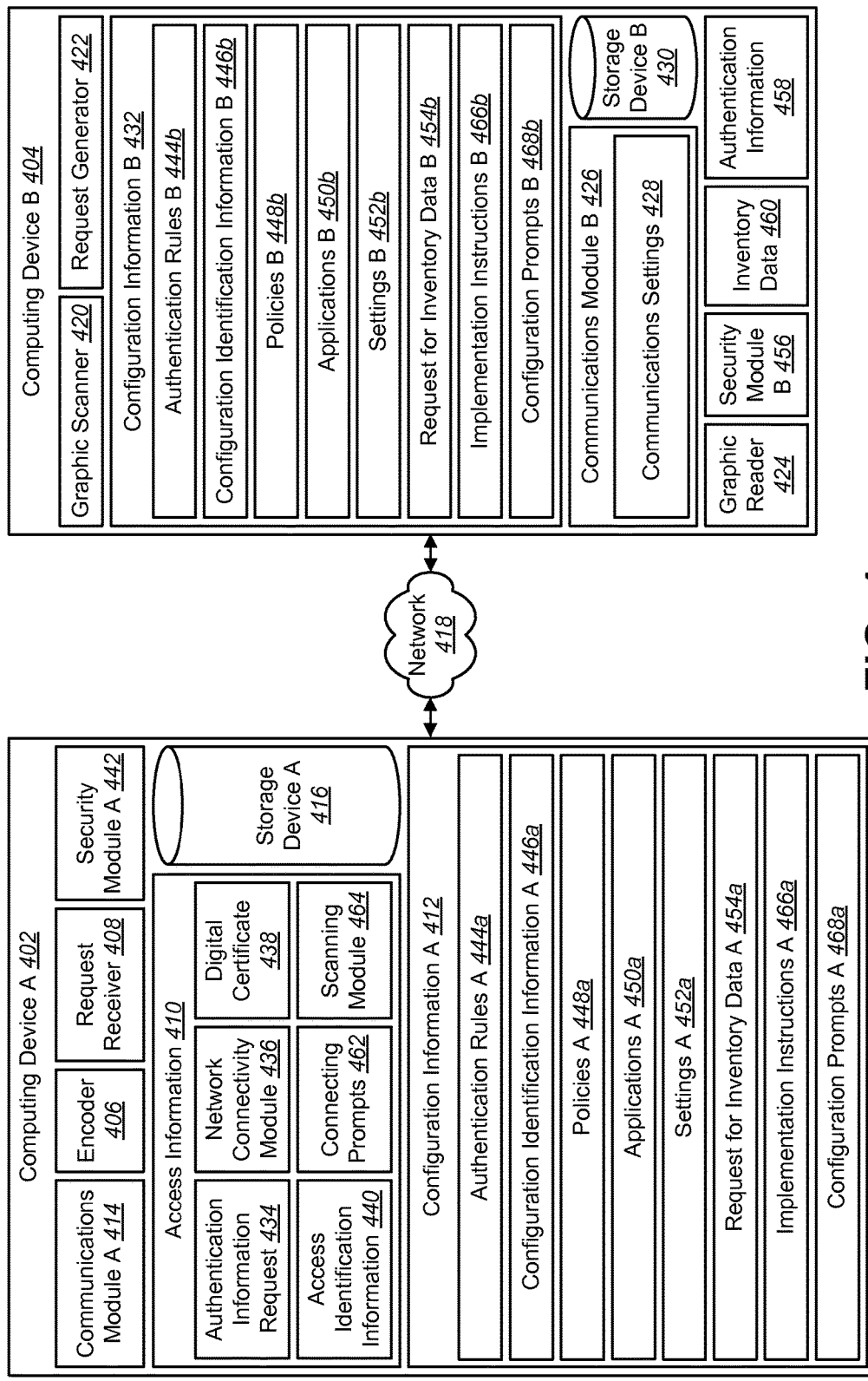
FIG. 4 is a block diagram that illustrates another configuration of computing devices in which systems and methods for sending and receiving configuration information may be implemented.

FIG. 4 is a block diagram that illustrates another configuration of computing devices 402, 404 in which systems and methods for sending and receiving configuration information may be implemented. Examples of computing device A 402 and/or computing device B 404 include, but are not limited to, desktop computers, laptop computers, servers, supercomputers, tablet devices, cellular phones, smartphones, gaming systems and any other computing device. It should be noted that while FIG. 4 depicts two computing devices 402, 404, the systems and methods disclosed herein may be applied to any number of computing devices 402, 404.

Computing device A 402 may be similar to computing device A 102 described previously. Computing device A 402 may include storage device A 416, encoder 406, request receiver 408 and/or communications module A 414 similar to corresponding elements described above in connection with FIG. 1.

Computing device B 404 may be similar to computing device B 104 described previously. Computing device B 404 may include graphic scanner 420, request generator 422, graphic reader 424, communications module B 426, communications settings 428 and/or storage device B 430 similar to corresponding elements described above in connection with FIG. 1. A network 418 may couple computing device A 402 and computing device B 404. The network 418 may be similar to network 118 described previously.

It should be noted that one or more of the elements depicted as included within computing device A 402, computing device B 404 and/or the network 418 may be implemented in hardware, software or a combination of both. For example, the encoder 406 may be implemented in hardware, software or a combination of both.

The encoder 406 may create a graphic that includes information. As described above, the graphic created by the encoder 406 may be based on the access information 410. As described above, access information 410 may include one or more pieces of information that allow computing device B 404 to communicate with computing device A 402 and/or the network 418. Upon reception, the access information 410 may then enable computing device B 404 to communicate with computing device A 402 and/or the network 418. The access information 410 may include access limitations imposed on computing device B 404.

Access information 410 may be similar to access information 110 described previously. In some implementations, access information 410 may include an authentication information request 434, a network connectivity module 436, a digital certificate 438, access identification information 440, connecting prompts 462 and/or scanning module 464.

Computing device A 402 may send an authentication information request 434 along with the access information 410 to identify computing device B 404. For example, an authentication information request 434 may include a request that computing device B 404 provide its IP address. In some implementations, access to the network 418 may be based on a response to the authentication information request 434. For example, computing device A 402 may determine whether or not to grant computing device B 404 access to the network 418 based on the response to the authentication information request 434. In this example, if computing device B 404 does not respond to the request or returns an invalid IP address, computing device A 402 may deny computing device B 404 access to the network 418. By comparison, if computing device B 404 does respond to the request with a valid IP address, computing device A 402 may grant computing device B 404 access to the network 418. According to some implementations, the determination by computing device A 402 whether to grant computing device B 404 access to the network 418 may be done without any input. In other implementations, computing device A 402 may base the determination on input. For example, computing device A 402 (e.g., through a system administrator) may evaluate the response to the authentication information request 434 to determine whether to grant computing device B 404 access to the network 418.

Access information 410 may include a network connectivity module 436. The network connectivity module 436 may format computing device B 404 to allow communication with computing device A 402 and/or the network 418. For example, the network connectivity module 436 may evaluate the internet communications protocols of computing device B 404. Then, computing device A 402 may determine if the internet communications protocols of computing device B 404 are compatible with internet communications across the network 418. In some implementations, the network connectivity module 436 may elicit modifications to computing device B 404. For example, computing device A 402 may alter computing device B's 404 communications settings 428 to restrict what types of data may be transferred across the network 418.

A digital certificate 438 may be included in the access information 410 to secure the transmission of the access information 410. In some implementations, the digital certificate 438 may encrypt the access information 410. Then upon presentation with a decryption key, computing device B 404 may decrypt the access information 410 to receive the access information 410 and/or obtain access to the network 418. According to some approaches, the decryption key may be provided separately from the digital certificate 438. This may increase the security of the transferred access information 410. Implementation of the digital certificate 438 may also authenticate the identity of computing device A 402 and/or the network 418.

Access identification information 440 provides computing device B 404 with the information to connect to the network 418. An example of access identification information 440 includes the SSID and passkey of the network 418. In some implementations, upon receipt of the access identification information 440, computing device B 404 may connect to the network 418 without any input. In another implementation, computing device B 404 may access the network 418 based on input, for example through an input interface where the SSID and passkey of the network 418 may be entered. According to an example, a portion of the access identification information 440 may be presented. For example, the SSID of the network 418 may be included in the access information 410. In this example, the passkey may be obtained by other means. Accessing the SSID and the passkey individually increases the security of the transfer of the access information 410.

A connecting prompt 462 may elicit input from computing device B 404 associated with granting computing device B 404 access to the network 418. For example, a connecting prompt 462 may elicit input from computing device B 404 pertaining to computing device B's 404 connection speed. Based on the response to the connecting prompt 462 computing device A 402 may modify computing device B's 404 access to the network 418. In other implementations, computing device A 402 may determine whether to grant computing device B 404 access to the network 418 based on the response to the connecting prompt 462. According to some approaches, configuration information B 432 may be based on computing device B's 404 response to the connecting prompts 462.

A scanning module 464 may scan computing device B 404 to identify any risk associated with granting computing device B 404 access to the network 418. For example, the scanning module 464 may identify a virus on computing device B 404, that may upload to the network 418 if computing device B 404 connects to the network 418. Based on the results of the scanning module 464 scan, computing device A 402 may restrict computing device B's 404 access to the network 418. In some implementations, computing device A 402 may not grant computing device B 404 access to the network 418. In another implementation, computing device A 402 may grant computing device B 404, less than full access to the network 418. In some implementations, the scanning module 464 may be included on another computing device. In these implementations, the other computing device may communicate the results of the scan to computing device A 402, wherein computing device A 402 may determine any access limitations imposed on computing device B 404.

Configuration information A 412 may be utilized to configure computing devices connected to the network 418. Configuration information A 412 may be similar to configuration information A 112 described previously. In some implementations, configuration information A 412 may include authentication rules A 444a, configuration identification information A 446a, policies A 448a, applications A 450a, settings A 452a, request for inventory data A 454a, implementation instructions A 466a, and/or configuration prompts A 468a.

Authentication rules A 444a, may establish identification standards associated with the network 418. For example, the authentication rules A 444a may require that computing devices on the network 418 provide their IP addresses before using a particular software application. This may ensure that any communication between computing device B 404 and computing device A 402 and/or the network 418 is authorized. Other examples of authentication rules A 444a include, but are not limited to, broadcast of identification information to the network 418, tracking histories of each computing device on the network 418, licensing information associated with applications present on the network 418 and/or communications authentication protocols associated with the network 418.

Configuration identification information A 446a may indicate identification information associated with the network 418. For example, the configuration identification information A 446a may indicate what policies A 448a and applications A 450a are present on the network 418. Other examples of configuration identification information A 446a include, but are not limited to, number and/or identification of the computing devices on the network 418, system characteristics of the computing devices on the network 418, system characteristics of the network 418, identification of subnets within the network 418, memory usage of the computing devices and/or the network 418, and/or data usage associated with the network 418.

Policies A 448a may establish operating standards across the network 418. Examples of policies A 448a include, but are not limited to communications protocols, for example restricting email communications to particular domains, restricting file types that may be transferred, and/or internet browsing restrictions; maintenance schedules; data storage allocations; power conservation procedures; anti-virus software implementation; and/or computer tracking procedures such as keylogging or browsing history storage.

Applications A 450a may include a set of instructions designed to perform a specified task on a computing device of the network 418. In some implementations, computing device B 404 may access and implement different applications B 450b associated with computing device A 402 and/or the network 418. Examples of applications A 450a include, but are not limited to, word processing programs, video editing programs, graphic design programs, desktop publishing programs, video conferencing programs, games, operating systems, human resources programs and/or data analysis programs.

According to some implementations, the applications A 450a may be included on computing device A 402. In other implementations, computing device A 402 may be an administrative server that identifies applications A 450a from another computing device (not shown in FIG. 4) on the network 418. In this example, the administrative server may identify an application A 450a located on the other computing device and relay all or part of the application A 450a to computing device B 404 as application B 450b. In this implementation, licensing information associated with the applications A 450a may also be included in configuration information A 412. In some implementations, this other computing device may be termed a management console and/or may access a management console on computing device A 402 that manages other computing devices (e.g., computing device B 404).

Settings A 452a may alter computing devices on the network 418 such that configuration information may be implemented. In some implementations, settings B 452b may alter computing device B 404 such that configuration information B 432 may be implemented on computing device B 404. For example, the settings B 452b may update computing device B's 404 video card driver to allow a video conferencing application B 450b to be implemented on computing device B 404.

A request for inventory data A 454a may direct computing devices on the network 418 to send inventory data to computing device A 402. For example, request for inventory data B 454b may request that computing device B 404 sends inventory data 460 to computing device A 402 and/or the network 418. From this inventory data request B 454b, computing device A 402 may obtain information from computing device B 404 associated with its system characteristics. Computing device A 402 may store this information on storage device A 416.

Implementation instructions A 466a may instruct computing devices on the network 418 how to implement configuration information. In some approaches, implementation instructions B 466b may direct computing device B 404 to restart at various intervals while implementing configuration information B 432. In other approaches, the implementation instructions B 466b may indicate the order in which to implement configuration information B 432. For example, the implementation instructions B 466b may indicate that an update to an operating system be implemented before a video card driver is installed.

Configuration prompts A 468a may elicit input from computing devices on the network 418 during implementation of configuration information. For example, configuration prompt B 468b may elicit input from computing device B 404 during implementation of configuration information B 432. In some approaches, configuration prompts B 468b may include a request for selection between optional applications B 450b to be implemented. For example, a configuration prompt B 468b may elicit a selection between two Wi-Fi configurations to be implemented on computing device B 404. Based on the selection, configuration information B 432 would incorporate the corresponding Wi-Fi configuration.

Communications module A 414 allows computing device A 402 to communicate with other computing devices on network 418. Communications module A 414 may set standards for communication between computing device A 402 and computing device B 404. Communications module A 414 may also include certain restrictions on communications.

The request receiver 408 receives requests for configuration information from computing device B 404. The request received by the request receiver 408 may include information relating to computing device B 404. Based on the request, the request receiver 408 may then determine related configuration information A 412. Additionally or alternatively, the request receiver 408 may determine pertinent configuration information A 412 based on input. In some implementations, the request receiver 408 may require authentication information 458 before processing a request.

Computing device A 402 may send all or part of configuration information A 412 to computing device B 404. Computing device B 404 may receive configuration information B 432 (which may be all or part of configuration information A 412, for example) from computing device A 402. In some implementations, computing device A 402 may be an administrative server that receives configuration information A 412 from another computing device (not shown in FIG. 4). In this example, the administrative server may receive configuration information A 412 from the other computing device and relay all or part of configuration information A 412 to computing device B 404. In some implementations, this other computing device may be termed a management console and/or may access a management console on computing device A 402 that manages other computing devices (e.g., computing device B 404).

In some implementations, security module A 442 may perform additional or alternative operations in order to secure communications. For example, security module A 442 may encrypt configuration information B 432. In another example, security module A 442 may implement a spread spectrum to transfer configuration information B 432 using a radio frequency signal to further secure configuration information B 432. In other examples, security module A 442 may create a password interface to accompany configuration information B 432, such that entry of a password is required before configuration information B 432 may be implemented.

Computing device A 402 may be coupled to computing device B 404 through a network 418 similar to the network 118 described previously. Examples of network 418 include personal area networks, local area networks, wide area networks, cellular networks and any other type of network.

The graphic scanner 420 records and stores the graphic to computing device B 404. In some implementations, a graphic reader 424 may be coupled to the graphic scanner 420. The graphic reader 424 may extract the information stored within the graphic. The graphic reader 424 may employ any number of decoding protocols to extract the information.

The request generator 422 may send a request to computing device A 402 to obtain configuration information B 432. The request sent by the request generator 422 may include information relating to computing device B 404. The request generator 422 may base the request on the characteristics of computing device B 404. The request generator 422 may also base the request on input.

Computing device B 404 may also include a communications module B 426 that allows computing device B 404 to communicate with computing device A 402 and/or the network 418. Communications settings 428 within communications module B 426 may establish the procedure by which computing device B 404 communicates with computing device A 402 and/or the network 418.

Computing device B 404 may receive configuration information B 432. Configuration information B 432 may represent information that establishes device settings related to computing device B 404. In some implementations, configuration information B 432 may constitute a portion of configuration information A 412. For example, as described above configuration information A 412 may include authentication rules A 444a, configuration identification information A 446a, policies A 448a, applications A 450a, settings A 452a, request for inventory data A 454a, implementation instructions A 466a, and/or configuration prompts A 468a. In this example configuration information B 432 may include a portion of any and/or all of these elements. For example, configuration information B 432 may include authentication rules B 444b, configuration identification information B 446b, policies B 448b, applications B 450b, settings B 452b, request for inventory data B 454b, implementation instructions B 466b and/or configuration prompts B 468b. More particularly, configuration information A 412 may include policies A 448a relating to power management and scheduled maintenance. In this example, configuration information B 432 may include policies B 448b relating to power management, while scheduled maintenance polices are not included. It should be noted that the pieces of configuration information A 412 corresponding to the pieces of configuration information B 432 may include the same or different amounts of information. For example, policies B 448b may be a subset or superset of policies A 448a.

In some implementations, the portion of configuration information A 412 included in configuration information B 432 may be associated with the device settings of computing device B 404. Computing device A 402 may send all or part of configuration information A 412 to computing device B 404. Computing device B 404 may receive configuration information B 432 (which may be all or part of configuration information A 412, for example) from computing device A 402.

In some implementations, security module B 456 may perform additional or alternative operations in order to access secure communications. For example, security module B 456 may decrypt configuration information B 432. In another example, security module B 456 may identify a bandwidth over which configuration information B 432 is transferred to extract configuration information B 432 from a spread spectrum. In other examples, the security module B 456 may include a password input interface to access configuration information B 432.

Authentication information 458 associated with computing device B 404 may identify computing device B 404 to computing device A 402 and/or the network 418. As described above, computing device A 402 may use the authentication information 458 to determine what, if any, level of access to the network 418 computing device B 404 is granted. For example, computing device A 402 may grant a mobile device less network access than a desktop computer. In this example, computing device A 402 may use the authentication information 458 associated with each computing device to grant an appropriate level of access to the network 418. Examples of authentication information 458 include, but are not limited to, username, password, biometric information, IP address, Media Access Control (MAC) address and device name verification.

Inventory data 460 associated with computing device B 404 may be included in computing device B 404. Examples of inventory data 460 include, but are not limited to, hardware inventory, software inventory, data inventory, network inventory and/or usage inventory. In some implementations, the inventory data 460 may be sent to computing device A 402 and/or the network 418. In these implementations computing device A 402 may implement the inventory data 460 to manage the computing devices on the network 418.

Figure 5:
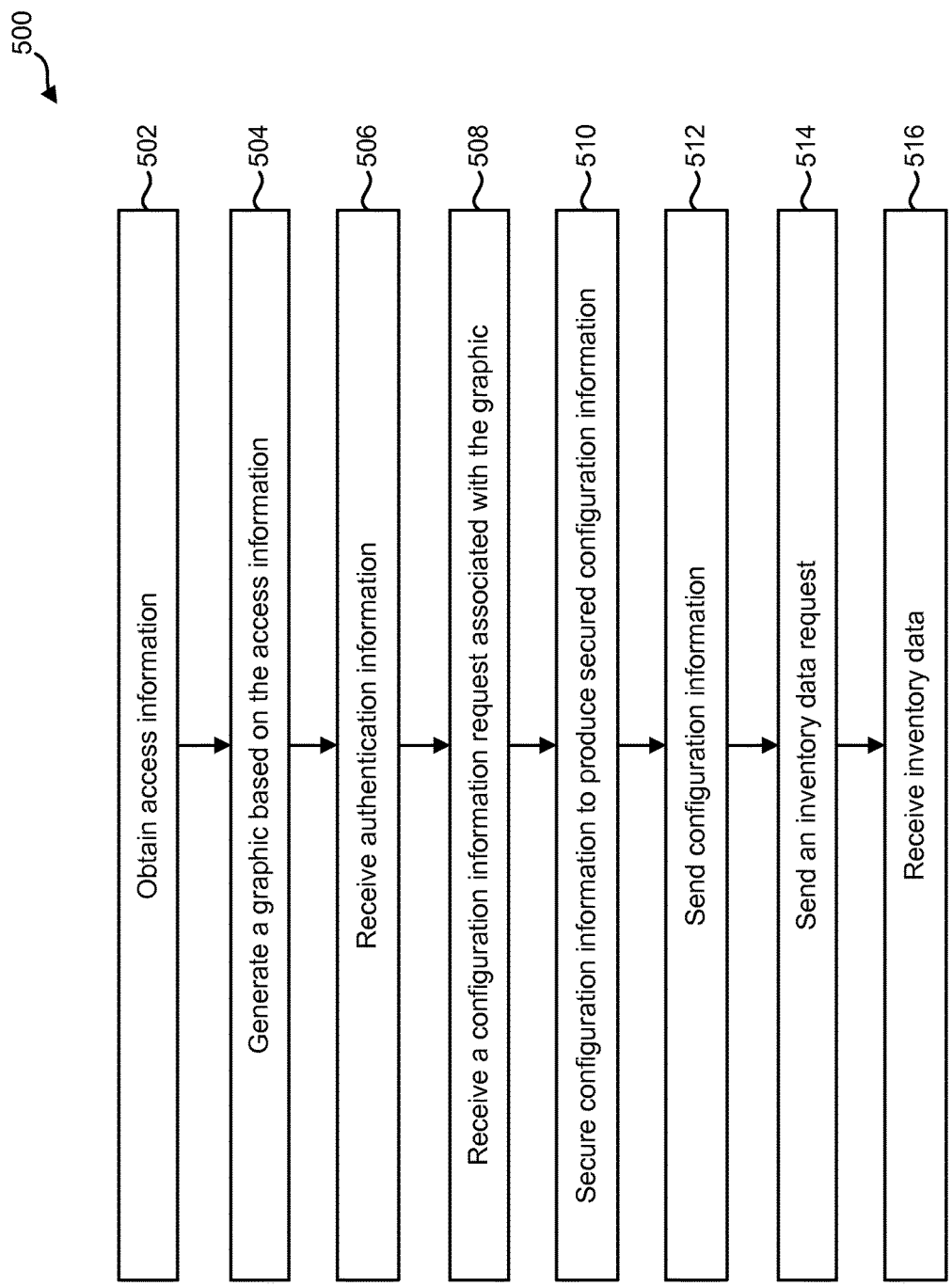
FIG. 5 is a flow diagram illustrating another configuration of a method for sending configuration information by a computing device.

FIG. 5 is a flow diagram illustrating another configuration of a method 500 for sending configuration information by a computing device. Computing device A 402 obtains 502 access information 410. In some implementations, this may be done as described in connection with FIG. 2. As described above, the access information 410 may include one or more pieces of information that allows communication between computing devices on the network 418.

The encoder 406 may generate 504 a graphic based on the access information 410. The access information 410 may be embedded in the graphic. In some implementations, this may be done as described in connection with FIG. 2.

If the access information 410 includes an authentication information request 434, computing device A 402 receives 506 the authentication information 458. Authentication information 458 associated with computing device B 404 may identify computing device B 404 to computing device A 402 and/or the network 418. For example, in this step computing device A 402 may receive the IP address of computing device B 404. In some implementations, computing device A 402 may be an administrative server that sends the authentication information 458 to another computing device. In this example, the administrative server may receive authentication information 458 from computing device B 404 and relay all or part of the authentication information 458 to the other computing device. In some implementations, this other computing device may be termed a management console and/or may access a management console on computing device A 402 that manages other computing devices (e.g., computing device B 404).

Based on the validity of the authentication information 458, computing device A 402 may determine what, if any, level of network access to grant computing device B 404. For example, if computing device A 402 receives invalid authentication information 458 (e.g., an invalid IP address), computing device A 402 may deny network access. In this example, computing device A 402 may deny a configuration information request sent by computing device B 404.

According to some implementations, computing device A's 402 determination of whether to grant computing device B 404 access to the network may be done without any input. In other implementations, computing device A 402 may base the determination on input. For example, computing device A 402 (e.g., through a system administrator) may evaluate the received authentication information 458 to determine what, if any, access to grant to computing device B 404.

In other implementations, computing device A 402 may apply the received authentication information 458 to determine what configuration information B 432 is sent to computing device B 404. For example, computing device A 402 may include Wi-Fi configuration information A 412 for a tablet. Computing device A 402 may use the authentication information 458 received from with computing device B 404 (e.g. a tablet) to determine that the Wi-Fi configuration information A 412 should be sent to computing device B 404.

The request receiver 408 receives 508 a configuration information request associated with the graphic. In some implementations, this may be done as described in connection with FIG. 2. Included is a request to send configuration information B 432 to computing device B 404.

Security module A 442 secures 510 configuration information B 432 to produce secured configuration information B 432. In some implementations, security module A 442 may perform additional or alternative operations in order to secure communications. For example, security module A 442 may encrypt configuration information B 432. Security module A 442 may use any number of encryption techniques to secure configuration information B 432. In another example, security module A 442 may associate a password with configuration information B 432 such that computing device B 404 may input the password before accessing configuration information B 432. In some approaches, computing device A 402 may provide computing device B 404 with the password to access configuration information B 432. Securing configuration information B 432 in this fashion increases the security of communications over the network 118.

Computing device A 402 sends 512 configuration information B 432. In some implementations, this may be done as described in FIG. 2. Configuration information B 432 may include a portion of configuration information A 412 stored on computing device A 402. In some implementations, sending configuration information B 432 may include obtaining configuration information B 432 from another computing device. For example, computing device A 402 (e.g., an administrative server) may first obtain configuration information A 412 from a management console before sending configuration information B 432 on to computing device B 404.

Computing device A 402 may send 514 an inventory data request to computing device B 404. In this request computing device A 402 may instruct computing device B 404 to determine inventory data 460 and send the inventory data 460 to computing device A 402 and/or the network 418. In some implementations computing device A 402 may store the inventory data 460 to storage device A 416. Computing device A 402 may further implement this inventory data 460 to manage computing devices on the network 418. In some implementations, the request may be based on authentication information 458. For example, after receiving authentication information 458 that identifies computing device B 404 as a smart phone, computing device A 402 may send a cellular network inventory data request. Furthermore, in this example, a request for inventory data pertaining to audio peripherals is not necessary, and as a result may not be sent.

In some implementations, computing device A 402 may also send a prompt eliciting a selection of what, if any, inventory data 460 to send to computing device A 402 and/or the network 418. For example, the inventory data request may include a prompt to elicit selection of whether to determine and send inventory data associated with computing device B's 404 operating system. In some implementations, access to the network 118 may be based on the response to the prompt. For example, if computing device B 404 elects not to send the operating system inventory data, computing device A 402 may terminate or otherwise restrict computing device B's 404 access to the network 418.

Computing device A 402 may also receive 516 inventory data 460. Computing device A 402 may implement this inventory data 460 in managing computing devices of the network 418. In some implementations, the inventory data 460 requested is not the same as the inventory data 460 received. For example, computing device B 404 may have elected to send a portion of the inventory data 460 requested. In this example, computing device A 402 may terminate, or otherwise restrict, computing device B's 404 access to the network 118. In another example, computing device A 402 may send a general inventory data request to computing device B 404 (e.g., a desktop computer) that includes a request for cellular usage inventory data 460. In this example, a desktop computer does not use a cellular network and therefore does not send information associated with this request. Thus, the inventory data 460 received does not match the inventory data 460 requested.

In this example, computing device a 402 may relay all or part of the inventory data 460 to another computing device. In some implementations, this other computing device may be termed a management console and/or may access a management console on computing device A 402 that manages other computing devices (e.g., computing device B 404).

Figure 6:
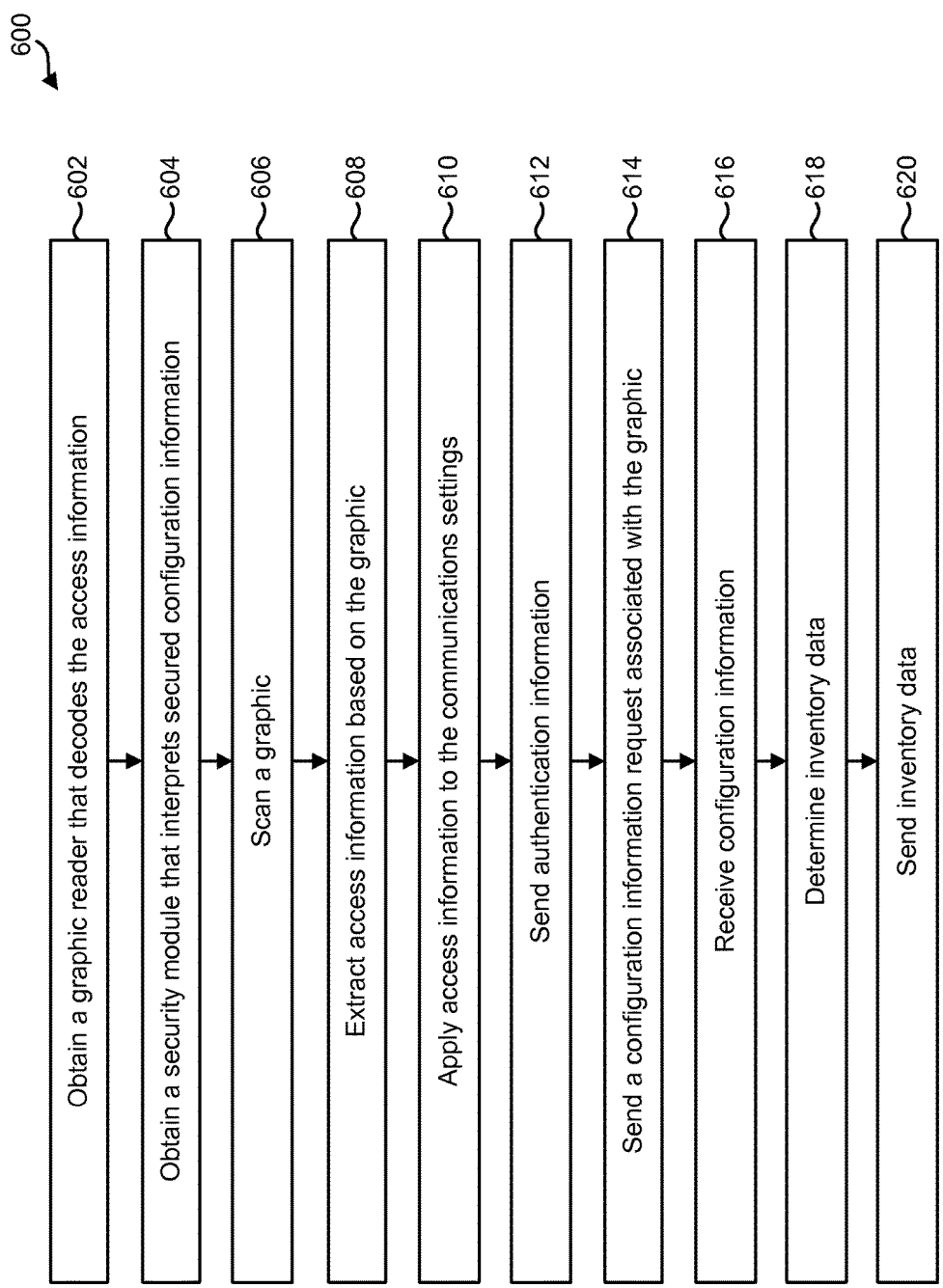
FIG. 6 is a flow diagram illustrating another configuration of a method for receiving configuration information by a computing device.

FIG. 6 is a flow diagram illustrating another configuration of a method 600 for receiving configuration information by a computing device. Computing device B 404 obtains 602 a graphic reader 424 that decodes the access information 410. The graphic reader 424 may extract the access information 410 stored within a graphic.

In some implementations, the graphic reader 424 may be obtained from computing device A 402. In other implementations, computing device A 402 may be an administrative server that obtains the graphic reader 424 from another computing device. In this example, the administrative server may obtain the graphic reader 424 from the other computing device and relay all or part of the graphic reader 424 to computing device B 404. In some implementations, the other computing device may be the manufacturer of computing device B 404 and/or the manufacturer of the graphic reader 424. In other implementations, this other computing device may be termed a management console and/or may access a management console on computing device A 402 that manages other computing devices (e.g., computing device B 404). In other implementations, this other computing device may be computing device B's 404 manufacturer.

In other implementations, computing device B 404 may obtain the graphic reader 424 from another computing device. In these implementations, the graphic reader 424 may be included with computing device B 404 or may be obtained separately from computing device B 404. For example, the graphic reader 424 could be downloaded from a website associated with the other computing device. In some implementations, this other computing device may be computing device B's 404 manufacturer.

Computing device B 404 may obtain 604 a security module that interprets secured configuration information B 432. As described above, security module A 442 may perform additional or alternative operations in order to secure communications. To interpret this secured configuration information, computing device B 404 may obtain a security module B 456 which may perform additional or alternative operations in order to access the secured configuration information.

In some implementations, computing device B 404 may obtain 604 the security module B 456 from computing device A 402. In other implementations, computing device A 402 may be an administrative server that obtains the security module B 456 from another computing device. In this example, the administrative server may obtain the security module B 456 from the other computing device and relay all or part of the security module B 456 to computing device B 404. In some implementations, the other computing device may be the manufacturer of computing device B 404 and/or the manufacturer of the graphic reader 424. In other implementations, this other computing device may be termed a management console and/or may access a management console on computing device A 402 that manages other computing devices (e.g., computing device B 404). In other implementations, this other computing device may be computing device B's 404 manufacturer.

In other implementations, computing device B 404 may obtain 604 the security module B 456 from another computing device. In these implementations, the security module B 456 may be included with computing device B 404 or may be obtained separately from computing device B 404. For example, the security module 456 could be downloaded from a website associated with the other computing device. In some implementations, this other computing device may be computing device B's 404 manufacturer.

The graphic scanner 420 scans 606 a graphic. In some implementations, this may be done as described in connection with FIG. 3. As described above, the graphic may contain the access information 410.

The graphic reader 424 may then extract 608 the access information 410 based on the graphic. In some implementations, this may be done as described in connection with FIG. 3. As explained above, the graphic contains the access information 410 that allows communication over the network 418. Upon extraction, the access information 410 may be used to send a configuration information request across the network 418. In some implementations, security module B 456 may perform additional or alternative operations in order to access secure communications. For example, security module B 456 may apply an algorithm to decrypt encrypted access information 410. In another example, security module B 456 may require entry of a password before access to the network 418 may be granted.

Computing device B 104 may apply 610 the access information 410 to the communications settings 428. In some implementations, this may be done as described in connection with FIG. 3. As described above, communications settings 428 may establish the procedures and protocols by which computing device B 404 communicates with other computing devices on the network 418 (e.g., computing device A 402).

Computing device B 404 may send 612 authentication information 458. In some implementations, computing device B 404 sends the authentication information 458 in response to an authentication information request 434*b*. The authentication information 458 may identify computing device B 404 to computing device A 402 and/or the network 418. For example, the authentication information 458 may include computing device B's 404 MAC address. In some implementations, computing device B 404 sends the authentication information 458 to computing device A 402 and/or the network 418. Whether or not computing device B 404 receives configuration information B 432 may be based on the authentication information 458 sent to computing device A 402. For example, computing device B 404 may send invalid authentication information 458, which may result in no configuration information B 432, or a limited portion of configuration information B 432, being received.

In some implementations, computing device B 404 sends the authentication information 458 without input. For example, upon applying the access information 410, computing device B 404 may send the authentication information 458 without input. In another example, computing device B 404 may require input before sending the authentication information 458.

The request generator 422 may send 614 a configuration information request associated with the graphic. In some implementations, this may be done as described in connection with FIG. 3. As described above, configuration information B 432 may represent information that establishes device settings related to computing device B 404. In some implementations, security module B 456 may perform additional or alternative operations in order to access secured configuration information B 432.

Computing device B 404 may receive 616 configuration information B 432. In some implementations, this may be done as described in connection with FIG. 3. As described above, configuration information B 432 may represent information that establishes device settings related to computing device B 404 and may be a subset of configuration information A 412. In some implementations, configuration information B 432 that is received is not the same as the configuration information requested.

Computing device B 404 may determine 618 inventory data 460. Computing device B 404 may include inventory data 460 that describes its system characteristics. As described above, computing device B 404 may include inventory data 460. Examples of inventory data 460 include, but are not limited to, hardware inventory, software inventory, data inventory, network inventory and/or usage inventory. In some implementations, computing device B 404 determines its inventory data 460 without any input. In other implementations, inventory data 460 is determined based on input. For example, computing device B 404 may include a prompt that upon selection determines the inventory data 460.

Computing device B 404 may send 620 the inventory data 460 to computing device A 402 and/or the network 418. In some approaches, computing device B 404 may send the inventory data 460 in response to an inventory data request. The inventory data 460 may be implemented by computing device A 402 and/or the network 418 to manage computing devices on the network 418. In some implementations, computing device B 404 may send the inventory data without any input. For example, upon receipt of an inventory data request, computing device B 404 may automatically send the inventory data 460. In other implementations, computing device B 404 may require input before sending the inventory data 460.

Figure 7:
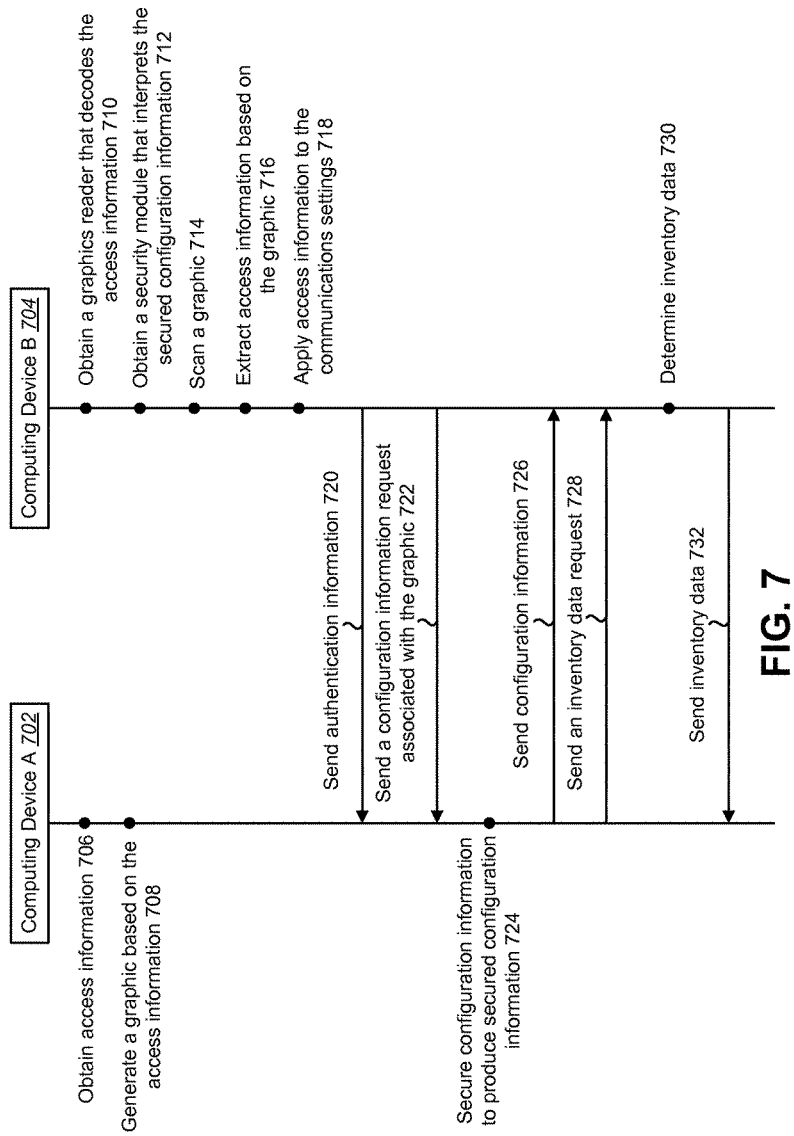
FIG. 7 is a thread diagram illustrating one configuration of a method for sending and receiving configuration information by computing devices.

FIG. 7 is a thread diagram illustrating one configuration of computing device A 702 and computing device B 704 sending and receiving configuration information. Computing device A 702 obtains 706 access information 410. In some implementations, this may be done as described in connection with FIG. 2. As described above, the access information 410 may include one or more pieces of information that allows communication between computing devices on the network 418.

Computing device A 702 generates 708 a graphic based on the access information 410. In some implementations, this may be done as described in connection with FIG. 2. The access information 410 may be embedded in the graphic.

Computing device B 704 obtains 710 a graphic reader 424 that decodes the access information 410. In some implementations, this may be done as described in connection with FIG. 6. The graphic reader 424 may extract the access information stored with a graphic.

Computing device B 704 may obtain 712 a security module B 456 that interprets secured configuration information B 432. In some implementations, this may be done as described in FIG. 6. In some implementations, security module B 456 may perform additional or alternative operations in order to access secure communications.

Computing device B 704 scans 714 a graphic generated by computing device A 702. In some implementations, this may be done as described in connection with FIG. 3. As described above, the graphic may contain the access information 410.

Upon receipt of the graphic, computing device B 704 may then extract 716 the access information 410 based on the graphic. In some implementations, this may be done as described in connection with FIG. 3. As explained above, the graphic contains the access information 410 that allows computing device B 704 to communicate with computing device A 702 and/or the network 418.

Computing device B 704 may apply 718 the access information 110 to the communications settings 428. In some implementations, this may be done as described in connection with FIG. 3. As described above, communications settings 428 may establish the procedures and protocols by which computing device B 704 communicates with other computing devices on the network 418.

If the access information 410 included an authentication information request 434*b*, computing device B 704 may send 720 authentication information 458 to computing device A 702. In some implementations, this may be done as described in connection with FIGS. 5 and 6. The authentication information 458 may identify computing device B 704 to computing device A 702 and/or the network 418.

After applying the access information 410, computing device B 704 may send 722 a configuration information request associated with the graphic to computing device A 702. In some implementations, this may be done as described in connection with FIGS. 2 and 3. As described above, included is a request to send configuration information B 432 to computing device B 704.

Computing device A 702 may secure 724 configuration information B 432 to produce secured configuration information B 432. In some implementations, this may be done as described in FIG. 5. Securing configuration information B 432 in this fashion increases the security of communications over the network 418.

Computing device A 702 may send 726 configuration information B 432 to computing device B 704. In some implementations, this may be done as described in FIGS. 2 and 3. Configuration information B 432 may include a portion of configuration information A 412 stored on computing device A 702.

Computing device A 702 may send 728 an inventory data request to computing device B 704. In some implementations, this may be done as described in FIG. 5. In this request computing device A 702 may instruct computing device B 704 to send inventory data 460 to computing device A 702 and/or the network 418.

Computing device B 704 may determine 730 inventory data 460. In some implementations, this may be done as described in FIG. 6. In some implementations computing device B 704 may determine inventory data 460 in response to an inventory data request sent by computing device A 702.

After collecting the inventory data, computing device B 704 may send 732 the inventory data to computing device A 702. In some implementations, this may be done as described in FIGS. 5 and 6.

Figure 8:
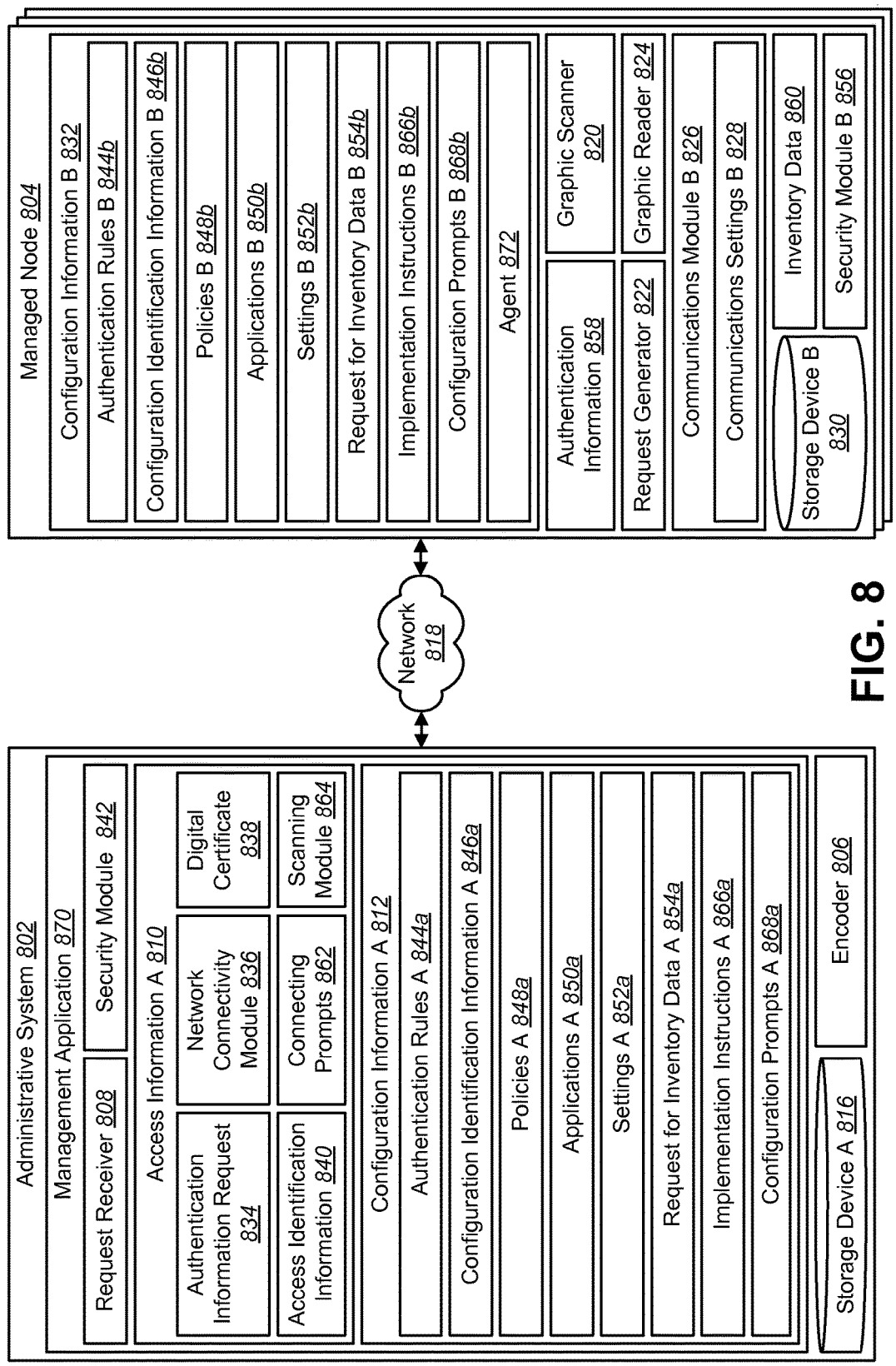
FIG. 8 is a block diagram that illustrates another configuration of computing devices in which systems and methods for sending and receiving configuration information may be implemented.

FIG. 8 is a block diagram that illustrates one configuration of an administrative system 802 and a managed node 804, in which systems and methods for sending and receiving configuration information may be implemented. It should be noted, that while FIG. 8 depicts one managed node 804, any number of managed nodes 804 may be present.

The administrative system 802 may include a management application 870, storage device A 816 and/or encoder 806 similar to corresponding elements described above in connection with FIG. 4. Managed node 804 may include authentication information 858, graphic scanner 820, request generator 822, graphic reader 824, communications module B 826, communications settings 828, inventory data 860, security module B 856 and/or storage device B 830 similar to corresponding elements described above in connection with FIG. 4. In some instances the administrative system 802 may communicate with the managed node 804 via a network 818 similar to the network 118 described previously.

It should be noted that one or more of the elements depicted as included within administrative system 802 and/or managed node 804 may be implemented in hardware, software or a combination of both. For example, the encoder 806 may be implemented in hardware, software or a combination of both.

The administrative system 802 implements the management application 870 to oversee managed node 804. In some implementations, the management application 870 includes a request receiver 808, security module A 842, access information 810 and/or configuration information A 812 similar to corresponding elements described above in connection with FIG. 4. In some implementations, the access information 810 incorporated in the management application 870 may include authentication information request 834, a network connectivity module 836, a digital certificate 838, access identification information 840, connecting prompts 862 and/or a scanning module 864 similar to corresponding elements described above in connection with FIG. 4.

Additionally, in some implementations, configuration information A 812 incorporated in the management application 870 may include authentication rules A 844a, configuration identification information A 846a, policies A 848a, applications A 850a, settings A 852a, request for inventory data A 854a, implementation instructions A 866a and/or configuration prompts A 868a similar to corresponding elements described above in connection with FIG. 4. In some approaches, configuration information B 832 may include authentication rules B 844b, configuration information B 846b, policies B 848b, applications B 850b, settings B 852b, request for inventory data B 854b, implementation instructions B 866b and/or configuration prompts B 868b similar to corresponding elements described above in connection with FIG. 4.

In some implementations, configuration information B 832 may include an agent 872. The agent 872 establishes a connection between the administrative system 802 and the managed node 804 wherein the administrative system 802 has some control over the managed node 804. For example, the agent 872 may permit the administrative system 802 to remotely control operational aspects of the managed node 804. Other examples of functions of the agent 872 include, but are not limited to, running diagnostic tests on the managed node 804, installing device drivers and/or applications 850b on the managed node 804, scanning for malware on the managed node 804, sending reports to the administrative system 802, prohibiting unauthorized use (e.g., prohibit software installations, prohibit browsing) on the managed node 804, relaying information to the administrative system 802, managing license usage by the managed node 804, managing power conservation on the managed node 804, directing certain activities (e.g., what software is running) on the managed node 804, and/or perform maintenance and/or repairs to the managed node 804.

Figure 9:
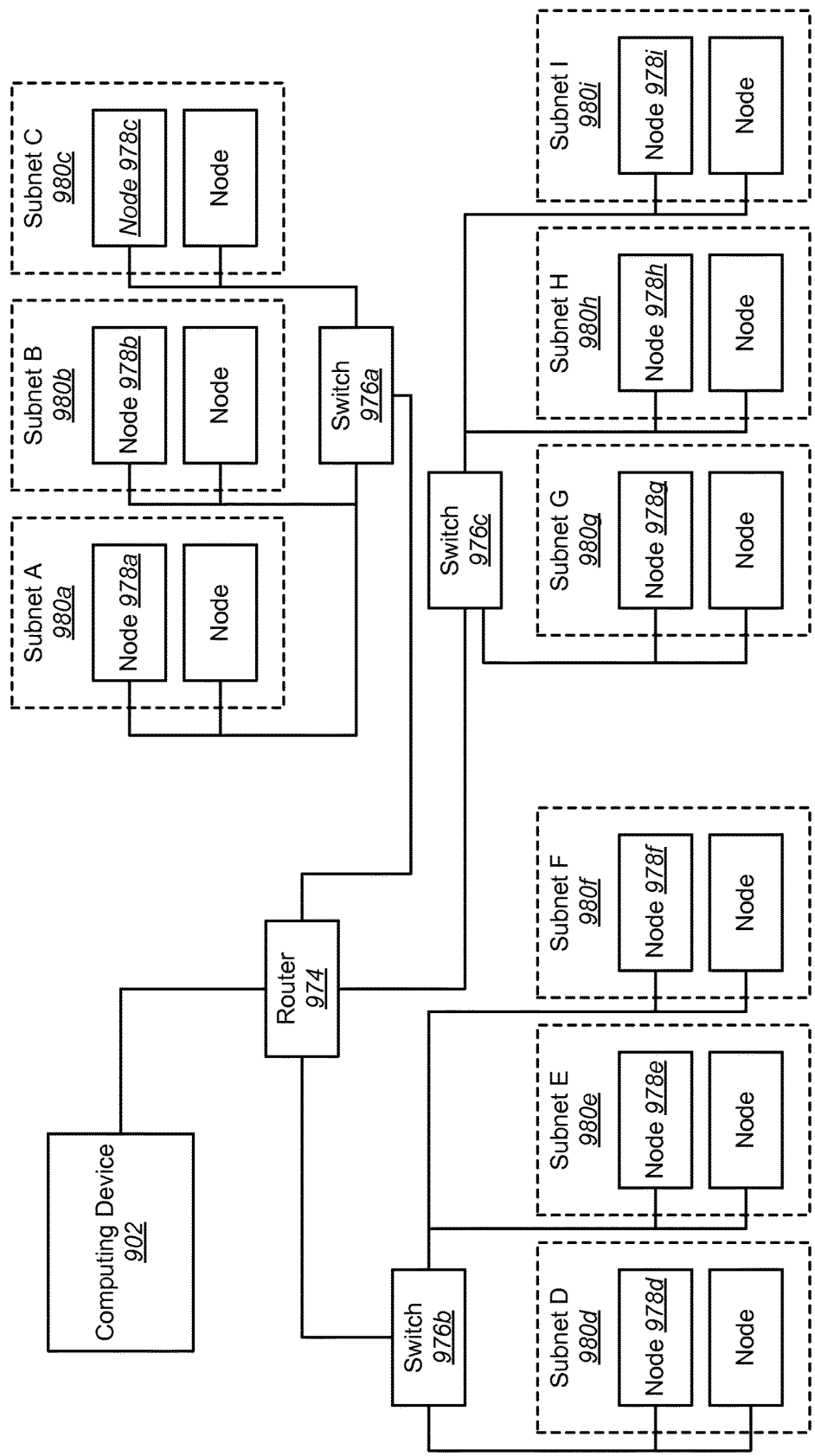
FIG. 9 is a block diagram that illustrates one configuration of a network where systems and methods for sending and receiving configuration information may be implemented.

FIG. 9 is a block diagram that illustrates one configuration of a network where systems and methods for sending and receiving configuration information may be implemented. A computing device 902 is connected to a router 974. In FIG. 9, the computing device 902 may be one example of one or more of the computing devices 102, 402, 702 and administrative system 802 described above. The router 974 is connected to switches 976a, 976b and 976c. Switch 976a is connected to several nodes 978a, 978b, 978c, etc., via their respective subnets 980a, 980b and 980c. The switch 976b is connected to several nodes 978d, 978e, 978f etc., via their respective subnets 980d, 980e and 980f. The switch 976c is connected to several nodes 978g, 978h, 978i, etc., via their respective subnets 980g, 980h, 980i. In FIG. 9, a node 978 may be one example of one or more of the computing devices 104, 404, 704 and managed node 804 described above. Although FIG. 9 only shows one router 974, and a limited number of switches 976, subnets 980 and nodes 978, many and varied numbers of routers 974 switches 976, subnets 980, and nodes 978 may be included in networks and/or systems where systems and methods for determining differences between file system contents may be implemented.

Figure 10:
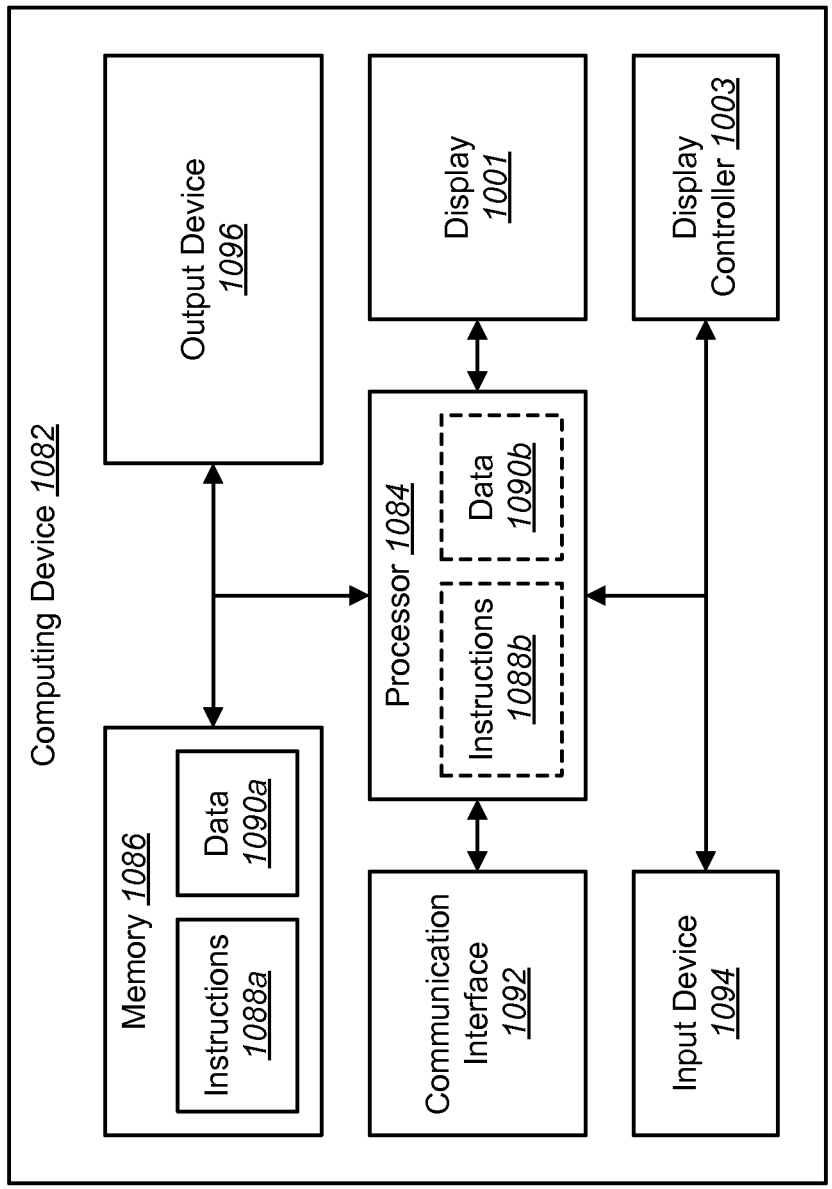
FIG. 10 illustrates various components that may be utilized on a computing device.

FIG. 10 illustrates various components that may be utilized on a computing device 1082. One or more of the computing devices 102, 102, 402, 404 702, 704, 902, administrative system 802, managed node 804 and nodes 978 described above may be implemented in accordance with the computing device 1082 illustrated in FIG. 10. For example, the computing device 1082 may be configured to perform one or more of the methods 200, 300, 500, 600 described above. The illustrated components may be located within the same physical structure or in separate housings or structures.

The computing device 1082 may include a processor 1084 and memory 1086. The processor 1084 controls the operation of the computing device 1082 and may be embodied as a microprocessor, a microcontroller, a digital signal processor (DSP) or other device known in the art. The memory 1086 may include instructions 1088a and data 1090a. The processor 1084 typically performs logical and arithmetic operations based on program instructions 1088*a* and data 1090*a* stored within the memory 1086. That is, instructions 1088*b* and data 1090*b* may be stored and/or run on the processor 1084. The instructions 1088*a-b* may be executable to perform one or more of the methods 200, 300, 500, 600 described above.

The computing device 1082 typically may include one or more communication interfaces 1092 for communicating with other electronic devices. The communication interfaces 1092 may be based on wired communication technology, wireless communication technology, or both. Examples of different types of communication interfaces 1092 include a serial port, a parallel port, a USB, an Ethernet adapter, an IEEE 1394 bus interface, a small computer system interface (SCSI) bus interface, an infrared (IR) communication port, a Bluetooth wireless communication adapter and so forth.

The computing device 1082 typically may include one or more input devices 1094 and one or more output devices 1096. Examples of different kinds of input devices 1094 include a keyboard, mouse, microphone, remote control device, button, joystick, trackball, touchpad, lightpen, etc. Examples of different kinds of output devices 1096 include a speaker, printer, etc. One specific type of output device that may be typically included in a computer system is a display device 1001. Display devices 1001 used with embodiments disclosed herein may utilize any suitable image projection technology, such as a cathode ray tube (CRT), liquid crystal display (LCD), light-emitting diode (LED), gas plasma, electroluminescence or the like. A display controller 1003 may also be provided for converting data stored in the memory 1086 into text, graphics and/or moving images (as appropriate) shown on the display device 1001.

Of course, FIG. 10 illustrates only one possible configuration of a computing device wherein systems and methods for determining a group based on a relationship may be performed. Various other architectures and components may be utilized.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

As used herein, the term "close to" and other variations thereof may mean that a low latency link exists between the two devices that are "close to" each other. For example, a low latency link may be a local area network that may cover a limited geographical area (e.g., home, office, computer laboratory, building, etc.).

As used herein, the term "agent" and other variations thereof may refer to software and/or hardware that is/are used to manage and/or perform operations on a managed computing device. For example, the agent may receive and perform instructions from an administrative system. For instance, the agent may uninstall software, eliminate threats (e.g., viruses, Trojans, worms, malware, adware, spyware, etc.), report information to the administrative system (e.g., usage reports, status, etc.), update firmware, detect unauthorized use, detect unauthorized products on the managed computing device, etc.

As used herein, the term "coupled" and other variations thereof may mean that one element is connected to another element directly or indirectly. For example, if a first element is coupled to a second element, the first element may be connected directly to the second element or may be connected to the second element through another element.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available medium that can be accessed by a computer or processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. It should be noted that a computer-readable medium may be non-transitory and tangible. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method(s). The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A computing device for sending configuration information comprising:
   a processor;
   a memory in electronic communication with the processor;
   instructions stored in the memory, the instructions being executable to:
   obtain access information;
   generate a graphic based on the access information, wherein the graphic comprises unencrypted access information and encrypted information;
   receive authentication information;
   send decryption information, wherein the decryption information enables extraction of the encrypted information;
   receive a configuration information request associated with the graphic;
   send the configuration information that comprises network settings for a managed node;
   send an inventory data request to the managed node; and
   receive inventory data comprising a hardware inventory and a software inventory of the managed node.

2. The computing device of claim 1, wherein generating the graphic based on the access information comprises encoding the access information into the graphic.

3. The computing device of claim 1, wherein the instructions are further executable to secure the configuration information to produce secured configuration information.

4. The computing device of claim 1, wherein the access information comprises at least one of the group consisting of an authentication information request, a network connectivity module, a digital certificate, access identification information, a connecting prompt and a scanning module.

5. The computing device of claim 1, wherein the configuration information further comprises at least one of the group consisting of an authentication rule, configuration identification information, a policy, an application, a setting, a request for inventory data, an implementation instruction and a configuration prompt.

6. A method for sending configuration information by a computing device, comprising:
   obtaining access information;
   generating a graphic based on the access information, wherein the graphic comprises unencrypted access information and encrypted information;
   receiving authentication information;
   sending decryption information, wherein the decryption information enables extraction of the encrypted information;
   receiving a configuration information request associated with the graphic;
   sending the configuration information that comprises network settings for a managed node;
   sending an inventory data request to the managed node; and
   receiving inventory data comprising a hardware inventory and a software inventory of the managed node.

7. The method of claim 6, wherein generating the graphic based on the access information comprises encoding access information into the graphic.

8. The method of claim 6, wherein the method further comprises securing the configuration information to produce secured configuration information.

9. The method of claim 6, wherein the access information comprises at least one of the group consisting of an authentication information request, a network connectivity module, a digital certificate, access identification information, a connecting prompt and a scanning module.

10. The method of claim 6, wherein the configuration information further comprises at least one of the group consisting of an authentication rule, configuration identification information, a policy, an application, a setting, a request for inventory data, an implementation instruction and a configuration prompt.

11. A computing device configured for receiving configuration information, comprising:
    a processor;
    a memory in electronic communication with the processor;
    instructions stored in the memory, the instructions being executable to:
    scan a graphic, wherein the graphic comprises unencrypted access information and encrypted information;
    extract the unencrypted access information based on the graphic;
    apply the unencrypted access information to one or more communications settings;
    send authentication information;
    receive decryption information;
    extract the encrypted information based on the decryption information;
    send a configuration information request associated with the graphic;
    receive the configuration information that comprises network settings for the computing device;
    receive an inventory data request from an administrative system;
    determine inventory data comprising a hardware inventory and a software inventory of the computing device; and
    send the inventory data to the administrative system.

12. The computing device of claim 11, wherein the instructions are further executable to receive a graphic reader that decodes the unencrypted access information.

13. The computing device of claim 11, wherein the configuration information is secured configuration information and wherein the instructions are further executable to receive a security module that interprets the secured configuration information.

14. The computing device of claim 11, wherein the unencrypted access information comprises an authentication information request.

15. A method for receiving configuration information by a computing device, comprising:
- scanning a graphic, wherein the graphic comprises unencrypted access information and encrypted information;
- extracting the unencrypted access information based on the graphic;
- applying the unencrypted access information to one or more communications settings;
- sending authentication information;
- receiving decryption information;
- extracting the encrypted information based on the decryption information;
- sending a configuration information request associated with the graphic;
- receiving the configuration information that comprises network settings for the computing device;
- receiving an inventory data request from an administrative system;
- determining inventory data comprising a hardware inventory and a software inventory of the computing device; and
- sending the inventory data to the administrative system.

16. The method of claim 15, wherein the method further comprises receiving a graphic reader that decodes the unencrypted access information.

17. The method of claim 15, wherein the configuration information is secured configuration information and wherein the method further comprises receiving a secured communications module that interprets the secured configuration information.

18. The method of claim 15, wherein the unencrypted access information comprises an authentication information request.

19. The method of claim 6, wherein the graphic is a micro quick response (QR) code or an artistic QR code.

* * * * *